US012723437B2

(12) United States Patent
Xiang

(10) Patent No.: US 12,723,437 B2
(45) Date of Patent: Sep. 1, 2026

(54) MORTISE AND REPLACEMENT LOCK FOR STORES DOOR

(71) Applicant: AISECURE INC., Anaheim, CA (US)

(72) Inventor: Dezhao Xiang, Anaheim, CA (US)

(73) Assignee: AISECURE INC., Anaheim, CA (US)

( * ) Notice: Subject to any disclaimer, the term of this patent is extended or adjusted under 35 U.S.C. 154(b) by 0 days.

(21) Appl. No.: 19/292,943

(22) Filed: Aug. 7, 2025

(65) Prior Publication Data

US 2026/0132655 A1 May 14, 2026

Related U.S. Application Data

(63) Continuation-in-part of application No. 18/954,561, filed on Nov. 21, 2024, which is a (Continued)

(30) Foreign Application Priority Data

May 29, 2025 (CN) ........................ 202521084016.5

(51) Int. Cl.
*E05B 63/08* (2006.01)
*E05B 17/20* (2006.01)
(Continued)

(52) U.S. Cl.
CPC .......... *E05B 63/08* (2013.01); *E05B 17/2007* (2013.01); *E05B 63/16* (2013.01); *E05B 63/20* (2013.01)

(58) Field of Classification Search
CPC .. E05B 17/20; E05B 17/2007; E05B 17/2019; E05B 63/0056; E05B 63/0065; E05B 63/08; E05B 63/16; E05B 63/20
See application file for complete search history.

(56) References Cited

U.S. PATENT DOCUMENTS 4,589,691 A * 5/1986 Foshee .................... E05B 63/16
292/DIG. 61
5,820,177 A * 10/1998 Moon ..................... E05B 63/20
292/335
(Continued)

FOREIGN PATENT DOCUMENTS

CN 118029771 A 5/2024
CN 119860118 A 4/2025

OTHER PUBLICATIONS

International Search Report Issued on Jan. 26, 2026 for Corresponding PCT Application No. PCT/CN2025/117476.
(Continued)

*Primary Examiner* — Christopher J Boswell

(57) ABSTRACT

A mortise and a replacement lock for stores door are provided. The mortise includes a housing; a deadlatch movably disposed within the housing; a drive sleeve configured to be engaged with the spindle and driven by the spindle to rotate in a first direction to drive a drive rod to move; a first reset component; and a second reset component, wherein when a driving force on the spindle is removed, the first reset component disposed on the drive sleeve drives the drive sleeve to rotate in a second direction opposite to the first direction to reset, and the deadlatch extends under an action of the second reset component connected to the deadlatch. In this application, the replacement lock for stores door can conveniently replace the old lock without the need to drill new holes in the door.

20 Claims, 19 Drawing Sheets

Related U.S. Application Data continuation-in-part of application No. PCT/CN2024/131010, filed on Nov. 8, 2024.

(51) Int. Cl.

| | |
|---|---|
| ***E05B 63/16*** | (2006.01) |
| ***E05B 63/20*** | (2006.01) |

(56) References Cited

U.S. PATENT DOCUMENTS

| | | | | |
|---|---|---|---|---|
| 7,188,870 | B2 * | 3/2007 | Huang | E05B 15/10<br>70/462 |
| 8,419,086 | B2 * | 4/2013 | Moon | E05B 55/00<br>292/108 |
| 11,156,021 | B2 * | 10/2021 | Guma | E05B 9/02 |
| 11,585,118 | B2 * | 2/2023 | Lin | E05B 63/08 |
| 2009/0229322 | A1 * | 9/2009 | Chou | E05B 59/00<br>70/107 |
| 2018/0274264 | A1 * | 9/2018 | Raatikainen | E05B 65/1086 |
| 2025/0172015 | A1 * | 5/2025 | Huang | E05B 59/00 |

OTHER PUBLICATIONS

Written Opinion of the Intentional Searching Authority Issued on Jan. 26, 2026 for Corresponding PCT Application No. PCT/CN2025/117476.

* cited by examiner

MORTISE AND REPLACEMENT LOCK FOR STORES DOOR

CROSS-REFERENCE TO RELATED APPLICATIONS

The present application is a Continuation in part Application of U.S. patent application Ser. No. 18/954,561, filed on Nov. 21, 2024, which is a Continuation in part Application of PCT Application No. PCT/CN2024/131010, filed on Nov. 8, 2024, which claims the priority of Chinese Patent Application No. 202410123874.X, filed on Jan. 29, 2024, and claims priority of Chinese Patent Application No. 202521084016.5, filed on May 29, 2025, the entire contents of which are hereby incorporated by reference.

TECHNICAL FIELD

The present disclosure relates to the technical field of locks, and in particular to a mortise and a replacement lock for stores door.

BACKGROUND

A lock refers to an apparatus that serves to close something, which includes a latch, indoor and outdoor components, a lock cylinder, a key and accessories etc. A lock has been already installed on an aluminum alloy door, and most stores are rented. When a new smart lock (including mechanical smart locks and electronic smart locks) is installed to replace the original lock, there are two core issues: firstly, landlords usually do not allow tenants to drill holes in their stores door; and secondly, even if the landlord allows tenants to drill holes, the cost of drilling holes is expensive and involves many certifications. Therefore, a replacement lock is capable of directly being installed without drilling holes and easy to install is an optimal choice.

With the development of technology, a stores door needs a keyless lock or more intelligent smart locks to solve problems of having to give the keys to employees to lock the door or having to rush back to the shop to lock the door at midnight when stores managers who have to leave work early due to urgent matters. Currently, the indoor and outdoor lock heads of a mortise on a metal stores door are independently installed and used at two sides, and the mortise causes the indoor and outdoor components to be not interconnected. The indoor and outdoor components and the mortise are not fixed on a same axis, making it impossible to design a keyless lock structure or an electronic lock gear-driven locking or unlocking mechanism. In this case, it is necessary to replace the existing lock with a smart mechanical password lock or an electronic smart lock to meet the usage requirements.

Please referring to FIG. 1, a lock 100 is shown. Since the lock 100 cannot be redesigned as a smart mechanical password lock or an electronic smart lock, merchants usually need to replace the lock 100 with a password lock to achieve keyless entry. When replacing the lock 100 with a new lock, the new lock must have the same outer dimensions as a mortise housing 1001 of the lock 100 and a center point, a torque, and an angle to open the lock should be re-found. Referring to FIG. 2 and FIG. 3, the lock 100 is installed on a door panel 102. The door panel 102 defines a mortise hole 1021 and a lock cylinder hole 1023. The lock 100 includes the mortise housing 1001, a deadlatch 1002, and a lock cylinder 1003. The deadlatch 1002 is assembled in the mortise housing 1001 and can be extended and retracted to lock or unlock with an opening on the door frame (not shown). The lock cylinder 1003 is installed in an installing hole 1005 of the mortise housing 1001 and a core 1007 is rotatably received in the lock cylinder 1003 to drive a cylinder cam (not shown) to rotate, thus driving the deadlatch 1002 to extend. The deadlatch 1002 retracts driven by a spring. The mortise housing 1001 is installed on the door panel 102 by screws passing through screw holes defined in the mortise housing 1001.

It is obvious that dimensions of the mortise hole 1021, the lock cylinder hole 1023, and the deadlatch 1002, dimensions of the mortise housing 1001, positions of the screw holes in the mortise housing 1001, relative position of the deadlatch 1002 and the lock cylinder hole 1023, the existing stroke of the deadlatch 1002, and position of the deadlatch 1002 on the mortise are all definite.

If the original lock 100 is to be replaced without drilling any holes, it is necessary to conduct an in-depth analysis of the design principles of the original lock. Further, it is also necessary to design a new lock having external dimensions, a stroke of the deadlatch, a distance of the deadlatch a position of the deadlatch, a torque, locking points, screw hole locations, rivet positions, thickness of the components, a diameter of the lock cylinder hole, a door hole, and all other dimensional structures the same as the original lock 100. In addition, it is required to recalculate the new physical transmission trajectories for the transmission center point, transmission torque, locking points, and locking torque within an extremely limited space, and new installation structures need to be added. In reality, this is quite challenging to achieve.

SUMMARY

The objective of the present invention is to provide a mortise and a replacement lock for stores door mortise deadlatch that enable the replacement lock for stores door can conveniently replace an old lock.

To achieve the above purpose, the present invention provides a mortise of a replacement lock for stores door, the mortise is configured to be engaged with an outdoor component, an indoor component and a spindle passing through the mortise. The mortise includes:

a housing configured to be fixed and mounted within an installation space of a door panel;

a deadlatch movably disposed within the housing;

a drive sleeve configured to be engaged with the spindle and was driven by the spindle to rotate in a first direction to drive a drive rod to move driven by the spindle, and thereby retracting the deadlatch;

a first reset component; and a second reset component, wherein when a driving force on the spindle is removed, the first reset component disposed on the drive sleeve drives the drive sleeve to rotate in a second direction opposite to the first direction to reset, and the deadlatch extends under an action of the second reset component connected to the deadlatch.

Optionally, the drive sleeve is located within the housing and is rotatably connected to two sides of the housing.

Optionally, the drive sleeve includes a sleeve tube and a rod, the rod protrudes from one side of an outer periphery of the sleeve tube, and the rod rotates within a certain range with the rotation of the drive sleeve to resist and drive the drive rod or separate from the drive rod.

Optionally, the drive sleeve is configured to be engage with the spindle to move together with the spindle, the drive sleeve is configured to receive the driving force from either end of the spindle to rotate, and one side of the drive sleeve protrudes to drive the drive rod to retract the deadlatch to achieve unlocking.

Optionally, the drive sleeve has a coupling hole non-rotatably coupled with the spindle, so that when the spindle is driven to rotate in the first direction, the spindle is capable of driving the drive sleeve to rotate.

Optionally, the first reset component is an elastic element, one end of the first reset component is fixed relative to the drive sleeve, and the other end of the first reset component is fixed relative to the housing; the second reset component is an elastic element, one end of the second component abuts the housing, and the other end of the second component abuts the deadlatch.

Optionally, the drive sleeve and the drive rod are separately arranged, and the drive rod is located on a rotation path of the drive sleeve.

Optionally, the mortise further includes an auxiliary deadlatch, the auxiliary deadlatch is pivotally disposed within the housing, the drive sleeve is also configured to drive the auxiliary deadlatch to retract when rotating in the first direction; when the driving force on the spindle is removed and the first reset component on the drive sleeve drives the drive sleeve to rotate in a second direction opposite to the first direction to reset, the auxiliary deadlatch extends under an action of the third reset component connected to the auxiliary deadlatch.

Optionally, the housing includes a first side plate, a second side plate, a first connecting plate, a second connecting plate, and a front plate, the first side plate and the second side plate are parallel and spaced apart, the first connecting plate and the second connecting plate are connected to the first side plate and the second side plate respectively to connect them together, and the front plate is located on the front side of the housing.

Optionally, the first side plate and/or the second side plate are provided with a first limiting groove and a second limiting groove extending along a direction of movement of the deadlatch, a first limiting block is formed on the deadlatch to movably positioned within the first limiting groove, and a second limiting block is formed on the auxiliary deadlatch to movably positioned within the second limiting groove.

Optionally, the drive rod includes a first part, a second part, and a third part, two ends of the second part are connected to the first part and the third part respectively, the first part is oriented towards the drive sleeve, the first part and the third part extend towards two sides of the second part respectively and form a certain angle with the second part respectively, a shaft hole is further defined in the drive rod, and the drive rod is rotatably connected to the deadlatch via a connecting shaft inserted into the shaft hole, the drive rod is rotatable around the connecting shaft relative to the deadlatch, and the shaft hole is defined at the connecting position between the second part and the third part.

Optionally, one side of the auxiliary deadlatch is provided with an extension portion, the extension portion corresponds to the third part, so that when the auxiliary deadlatch retracts, the extension portion comes into contact with the third part.

Optionally, the first side plate and/or the second side plate are further provided with a guiding groove, a protrusion formed on the drive rod is movably accommodated within the guide groove of the housing.

The present application further provides a replacement lock for stores door, configured to be mounted on a first component of a stores door so as to lock or unlock the first component relative to a second component. The replacement lock for stores door includes:

- the above-described mortise;
- an outdoor component configured to mounted at an outer side of the first component;
- an indoor component configured to mounted at an inner side of the first component;
- a spindle rotatably disposed and passing through a coupling hole of the drive sleeve; and
- wherein the mortise is located between the indoor component and the outdoor component, and the spindle extends inward from the outdoor component through the mortise and is connected to the indoor component.

Optionally, the outdoor component includes a first external force drive component connected to one end of the spindle, the first external force drive component is configured to drive the spindle to rotate to drive the drive sleeve to rotate in the first direction; the indoor component includes a second external force drive component connected to the other end of the spindle, the second external force drive component is configured to drive the spindle to rotate to drive the drive sleeve to rotate in the first direction.

Optionally, the lock further includes an installation fixing component, the installation fixing component includes one or more screw disposed on the indoor component;

- wherein the outdoor component has one or more installation post, one of the screw and the installation post passes through the mortise, and the screw and the installation post are connected to each other; or the outdoor component has one or more screw hole, and the screw passes through the mortise and is connected to the screw hole.

Optionally, the first reset component is an elastic element, one end of the first reset component is fixed relative to the drive sleeve, and the other end of the first reset component is fixed relative to the housing; the second reset component is an elastic element, one end of the second component abuts the housing, and the other end of the second component abuts the deadlatch.

Optionally, the drive sleeve and the drive rod are separately arranged, and the drive rod is located on a rotation path of the drive sleeve.

Optionally, the mortise further includes an auxiliary deadlatch, the auxiliary deadlatch is pivotally disposed within the housing, the drive sleeve is also configured to drive the auxiliary deadlatch to retract when rotating in the first direction; when the driving force on the spindle is removed and the first reset component on the drive sleeve drives the drive sleeve to rotate in a second direction opposite to the first direction to reset, the auxiliary deadlatch extends under the action of the third reset component connected to the auxiliary deadlatch.

In the mortise and the replacement lock for stores door of this embodiment, the arrangement of the drive sleeve coupled with the mortise, allows for easy design of the relative position between the lock hole and the extended position of the deadlatch, as well as the overall size of the mortise. Moreover, it can conveniently re-find the center point, torque, and rotation angle with a high degree of consistency with the old lock. Therefore, the replacement lock for stores door of this application can conveniently replace the old lock without the need to drill new holes in the door.

BRIEF DESCRIPTION OF DRAWINGS

In order to illustrate the embodiment of the disclosure more clearly, the following is a brief description of the drawings used in the embodiment. Apparently, the drawings described below are only some embodiments of the disclosure, and other drawings can be obtained according to these drawings for the person skilled in the art without creative labor.

DRAWING REFERENCE

Figure 1:
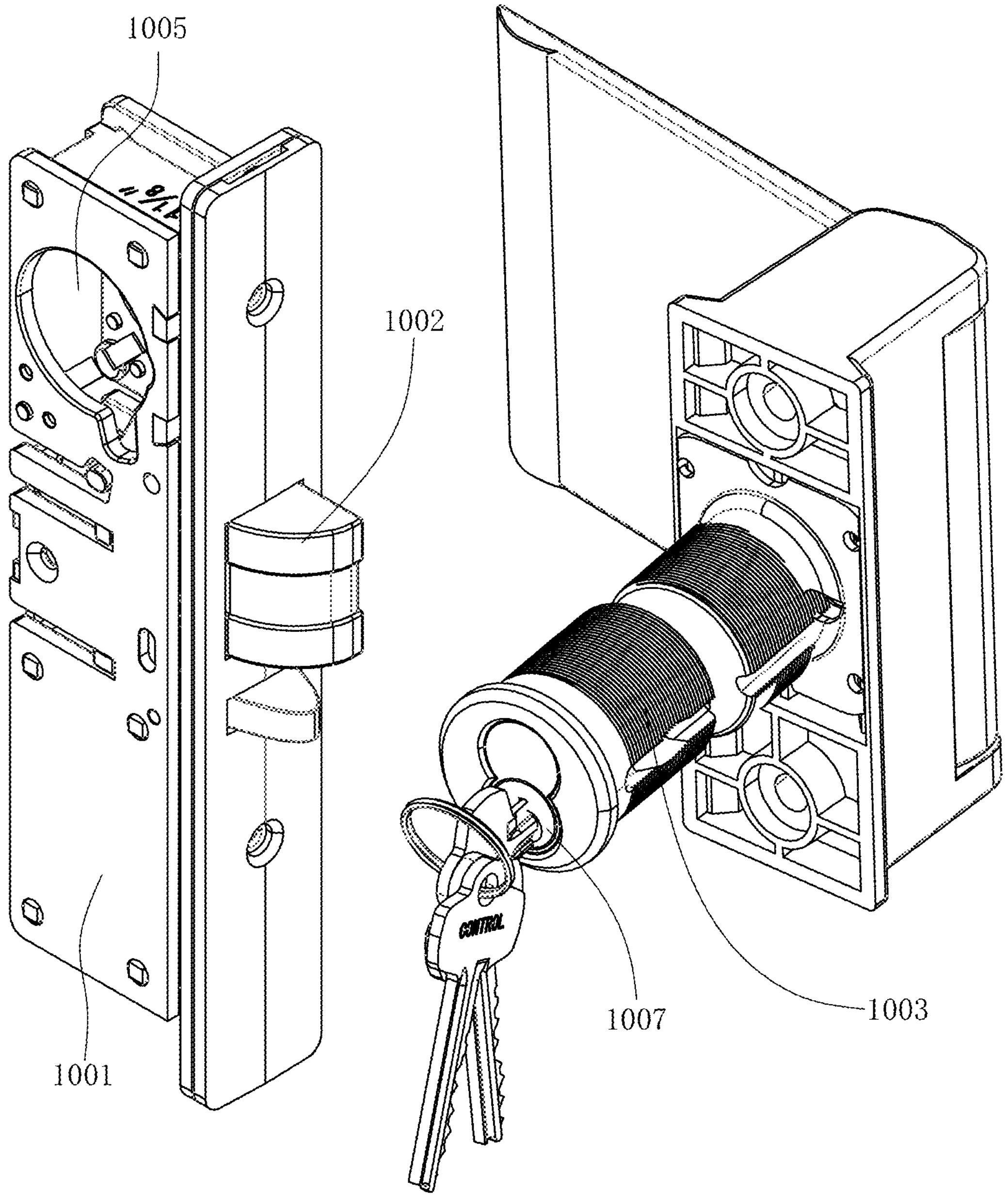
FIG. 1 shows an old lock.
Figure 2:
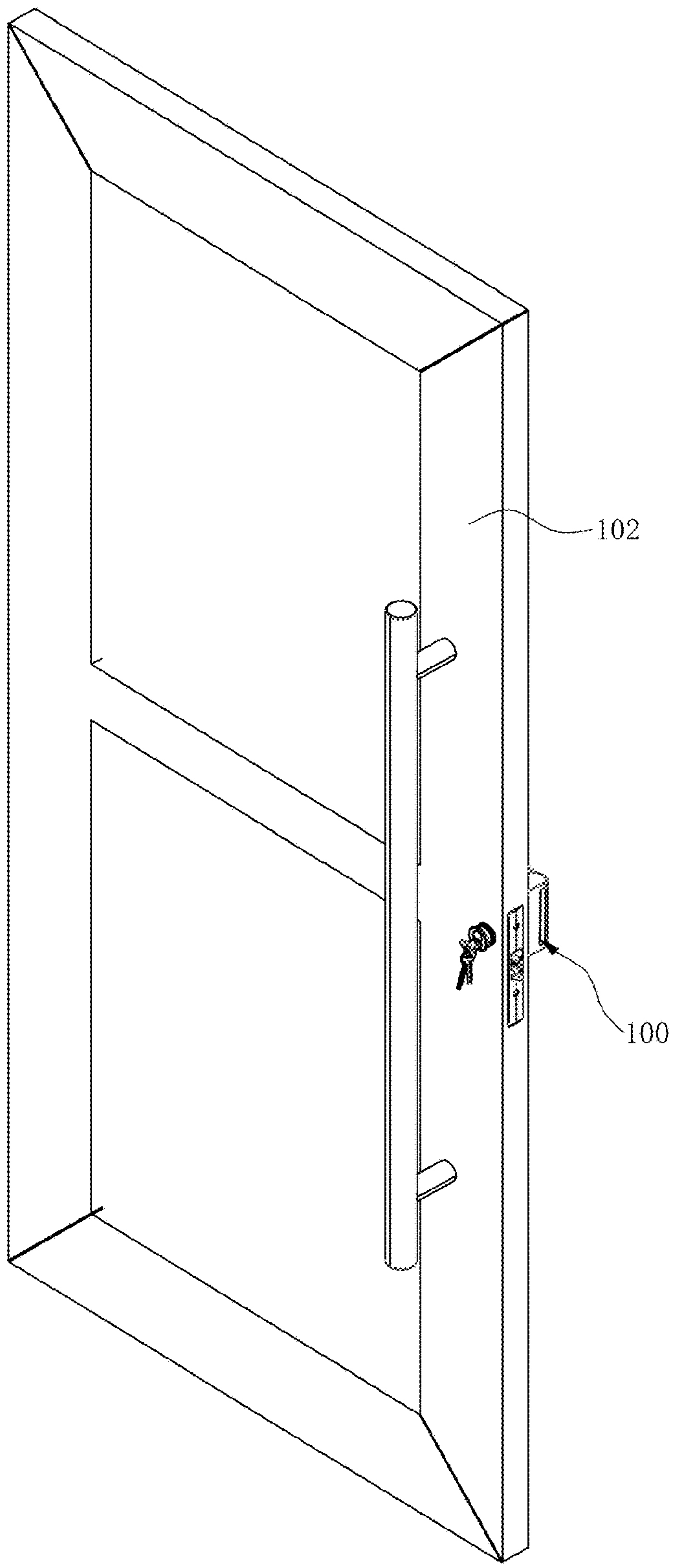
FIG. 2 is a schematic view showing the lock of FIG. 1 installed in a door panel.
Figure 3:
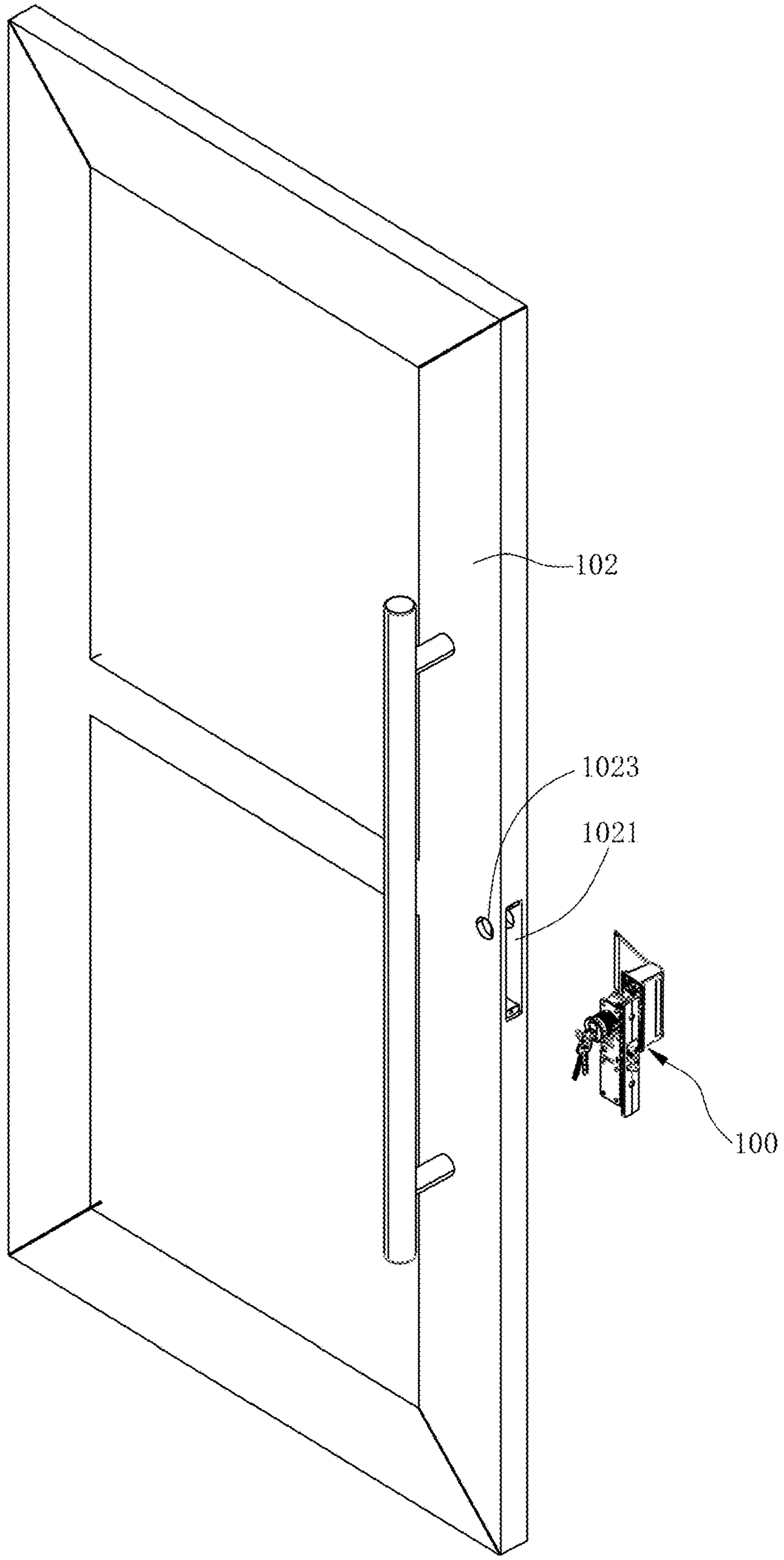
FIG. 3 is an exploded view of FIG. 2.
Figure 4:
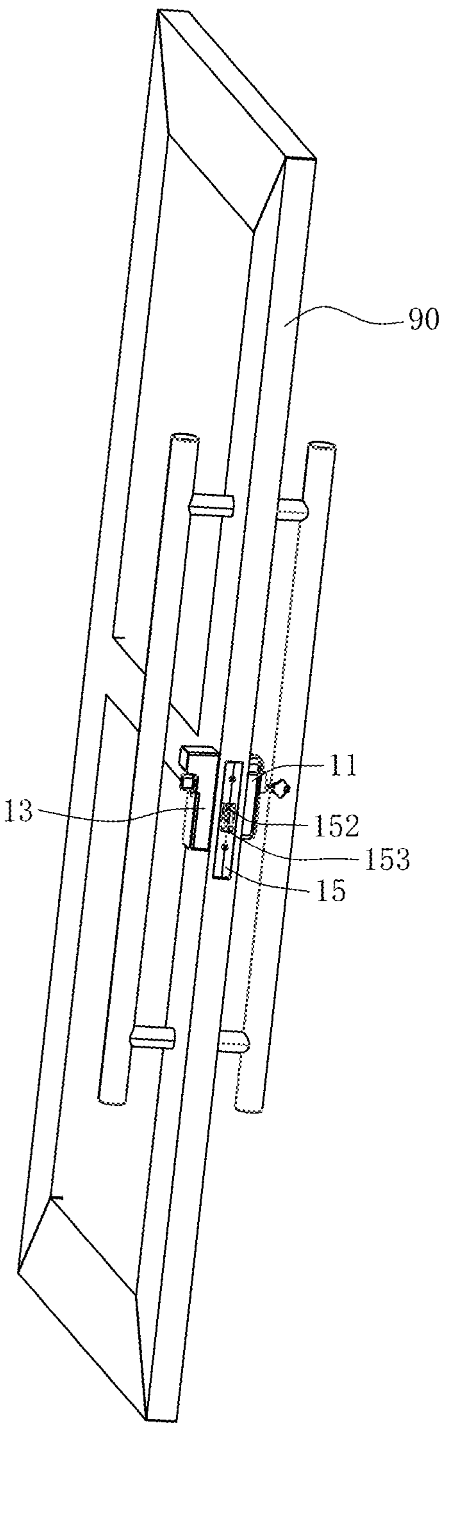
FIG. 4 is a schematic view of a replacement lock for stores door according to a first embodiment of the present disclosure installed in a door panel.
Figure 5:
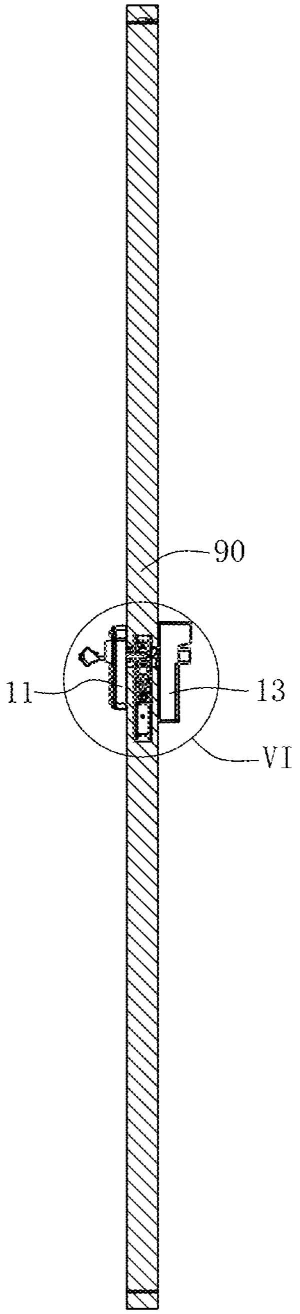
FIG. 5 is a sectional view of FIG. 4.
Figure 6:
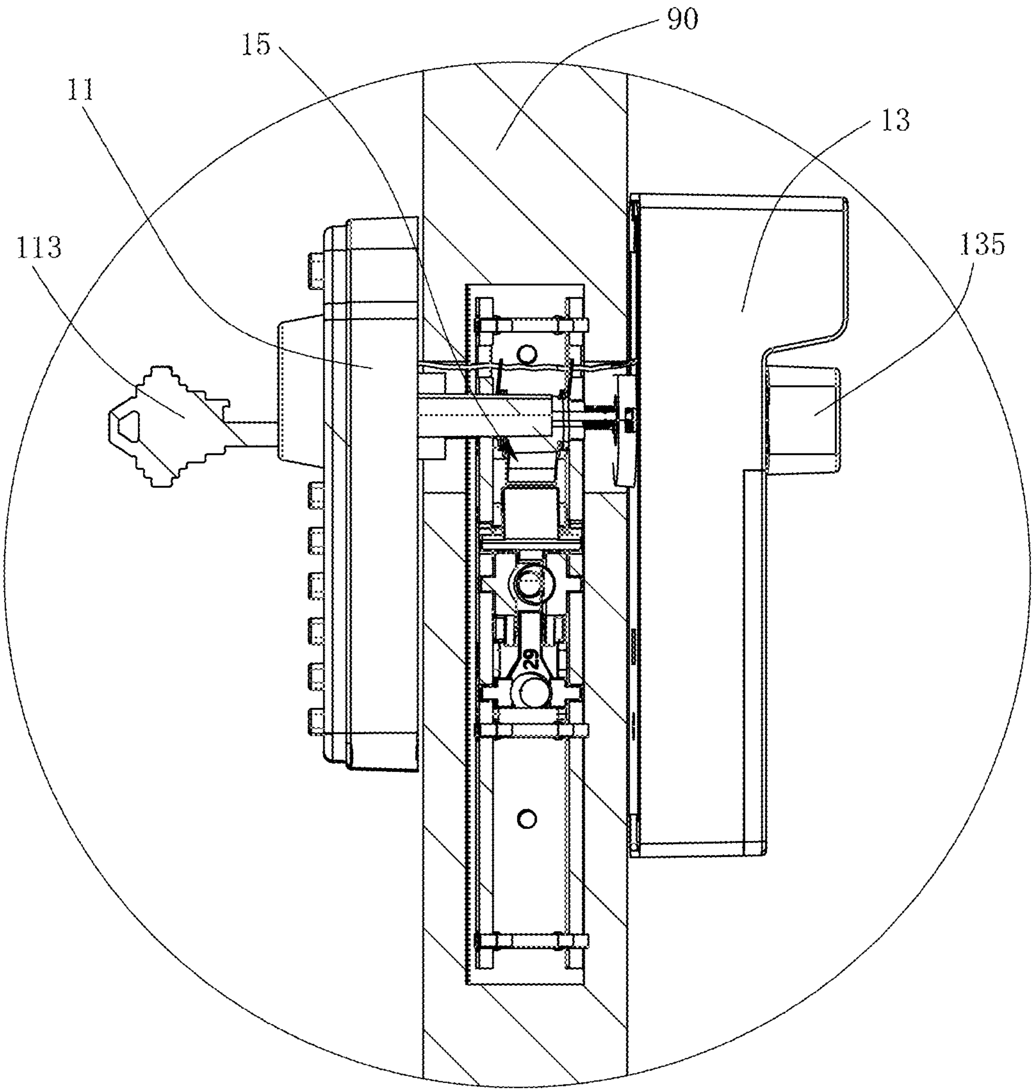
FIG. 6 is a partially enlarged view of VI in FIG. 5.
Figure 7:
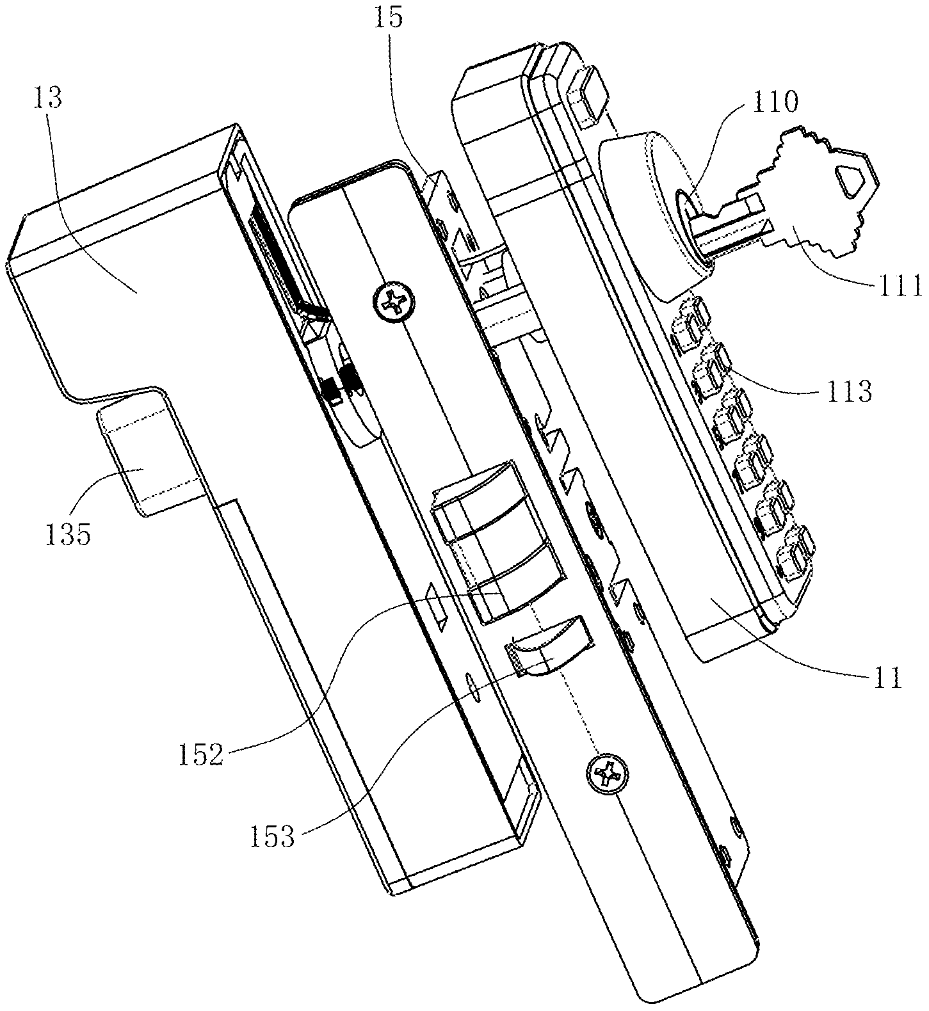
FIG. 7 is a schematic assembled view of the replacement lock for stores door of FIG. 4.

- 11: Outdoor component; 110: Lock cylinder; 111: Key; 112: Motor; 113: Keypad; 114: Conductive wire; 116: Outer main housing; 1163: Protruding post; 117: Outer cover plate; 1173: First fastener; 1175: First through hole;
- 13: Indoor component; 131: Sleeve; 1311: Inserting hole; 135: Second external force drive component; 137: Indoor transmission assembly; 1371: Gear; 139: Inner main housing; 140: Inner sub-housing; 141: Inner sub-cover; 142: Inner cover; 1421: Second through hole;
- 15: Mortise; 151: Housing; 1511: First side plate; 1512: Second side plate; 1513: First connecting plate; 1514: Second connecting plate; 1515: Front plate; 1516: Snap block; 1517: Snap hole; 1518: Third through hole; 15191: Rear plate; 15193: Third connecting plate; 1520: First limiting groove; 1521: Second limiting groove; 1523: Guiding groove; 1525: Recess; 1527: Fixing post; 1528: Limiting post; 152: Deadlatch; 1522: First limiting block; 153: Auxiliary deadlatch; 1531: Second limiting block; 1533: Extension portion; 154: Installation hole; 1553: Drive sleeve; 15531: Sleeve tube; 15533: rod; 15534: Coupling hole; 1555: Drive rod; 15551: First part; 15552: Second part; 15553: Third part; 15555: Shaft hole; 1556: First reset component; 1557: Second reset component; 1558: Third reset component; 1561: Connecting shaft; 1563: Protrusion;
- 17: Spindle; 171: Base plate; 173: Notch;
- 19: Installation fixing component; 130: Screw; 1301: Threaded portion; 1171: Installation post;
- 31: Outdoor component; 311: Knob; 316: Outer main housing; 317: Outer cover plate;
- 33: Indoor component; 331: Sleeve; 3311: Inserting hole; 3313: Mating post; 335: Second external force drive component; 3355: Lever; 33551: Connecting part; 33553: Operating part; 3356: Latch; 33561: Latch block; 33562: Latch plate; 3351: Receiving groove; 3353: pushing block; 339: Base; 340: Inner cover; 342: Rotation shaft;
- 80, 80': Replacement lock for stores door;
- 90: Door panel.

DESCRIPTION OF EMBODIMENTS

The technical solution in the embodiments of the present application will be clearly and completely described below with reference to accompanying drawings in the embodiments of the present application. Obviously, the described embodiments are only a part of the embodiments of the present application, but not all of the embodiments. Based on the embodiments of the present application, all other embodiments obtained by those skilled in the art without any creative efforts fall within the protection scope of the present application.

Where specific techniques or conditions are not specified in the examples, they may be carried out in accordance with the techniques or conditions described in the literature of this field or in accordance with the product instructions.

First Embodiment

Please referring to FIG. 4 to FIG. 7, a replacement lock for stores door 80 according to a first embodiment of the present application is configured to be mounted at a door panel 90, and configured to releasably lock an object to be locked (the object to be locked may be a fixed door frame or another movable door panel) relative to the door panel 90. It should be understood that the replacement lock for stores door 80 may also be mounted at a fixed door frame, with the object to be locked being the door panel. In this embodiment, the replacement lock for stores door 80 includes an outdoor component 11, an indoor component 13, a mortise 15, and a spindle 17. The outdoor component 11 is mounted at an outer side of the door panel 90 and includes a lock cylinder 110. The indoor component 13 is mounted at an inner side of the door panel 90. The mortise 15 is located between the outdoor component 11 and the indoor component 13. Wherein the outer and inner sides of the door panel 90 are opposite two sides. Generally, when the door panel 90 is in use, the side facing interior of a room is considered the inner side, and the side facing exterior of the room is considered the outer side. The mortise 15 includes a deadlatch 152, which is capable of extending outward from the door panel 90 or retracting into the door panel 90 to achieve locking or unlocking. One end of the spindle 17 is connected to the lock cylinder 110 of the outdoor component 11, and the spindle 17 is rotatably arranged.

In this embodiment, the lock cylinder 110 of the outdoor component 11 may be a pin tumbler lock, a disc tumbler lock, a magnetic lock, a smart card lock, a fingerprint lock etc. The present application does not intend to limit a type of the specific lock cylinder of the indoor component 11, as long as it can meet the usage requirements of the lock.

Specifically, the outdoor component 11 may further include a first external force drive component connected to the lock cylinder 110 of the outdoor component 11 or one end of the spindle 17. The first external force drive component is configured to drive the lock cylinder 110 of the outdoor component 11 or the spindle 17, thereby causing the spindle 17 to rotate in a first direction and consequently moving the deadlatch 152 of the mortise 15 to move to retract. Specifically, the first external force drive component may be a knob, a handle, or a motor, etc. and is sleeved on the lock cylinder 110 of the outdoor component 11. In this embodiment, the first external force drive component includes a key 111 engaged with the lock cylinder 110 and a motor 112 connected to the spindle 17 (see FIG. 8 and FIG. 9). The outdoor component 11 further includes a keypad 113, which is electrically connected to the motor 112. Users may insert a matching key 111 into a keyhole of the lock cylinder 110 and rotate the key 111 to turn the lock cylinder 110, thereby extending or retracting the deadlatch 152; alternatively, users may input a password into the keypad 113. When the password is correct, the motor 112 drives the spindle 17 to rotate, thereby retracting the deadlatch 152. In this way, a keyless locking structure is achieved. That is to say, in this embodiment, the replacement lock for stores door 80 is an electronic password lock. In this embodiment, the motor 112 is mounted at the indoor component 13. Certainly, the motor 112 may also be mounted at the outdoor component 11 or the mortise 15. The motor 112 is electrically connected to the keypad 113 via a conductive wire 114. It should be understood that an input component, such as a fingerprint recognition unit or a facial recognition unit, may be added to the outdoor component 11, or the keypad 113 may be replaced with another input component such a fingerprint recognition unit or a facial recognition unit to receive different types of decryption information.

Figure 8:
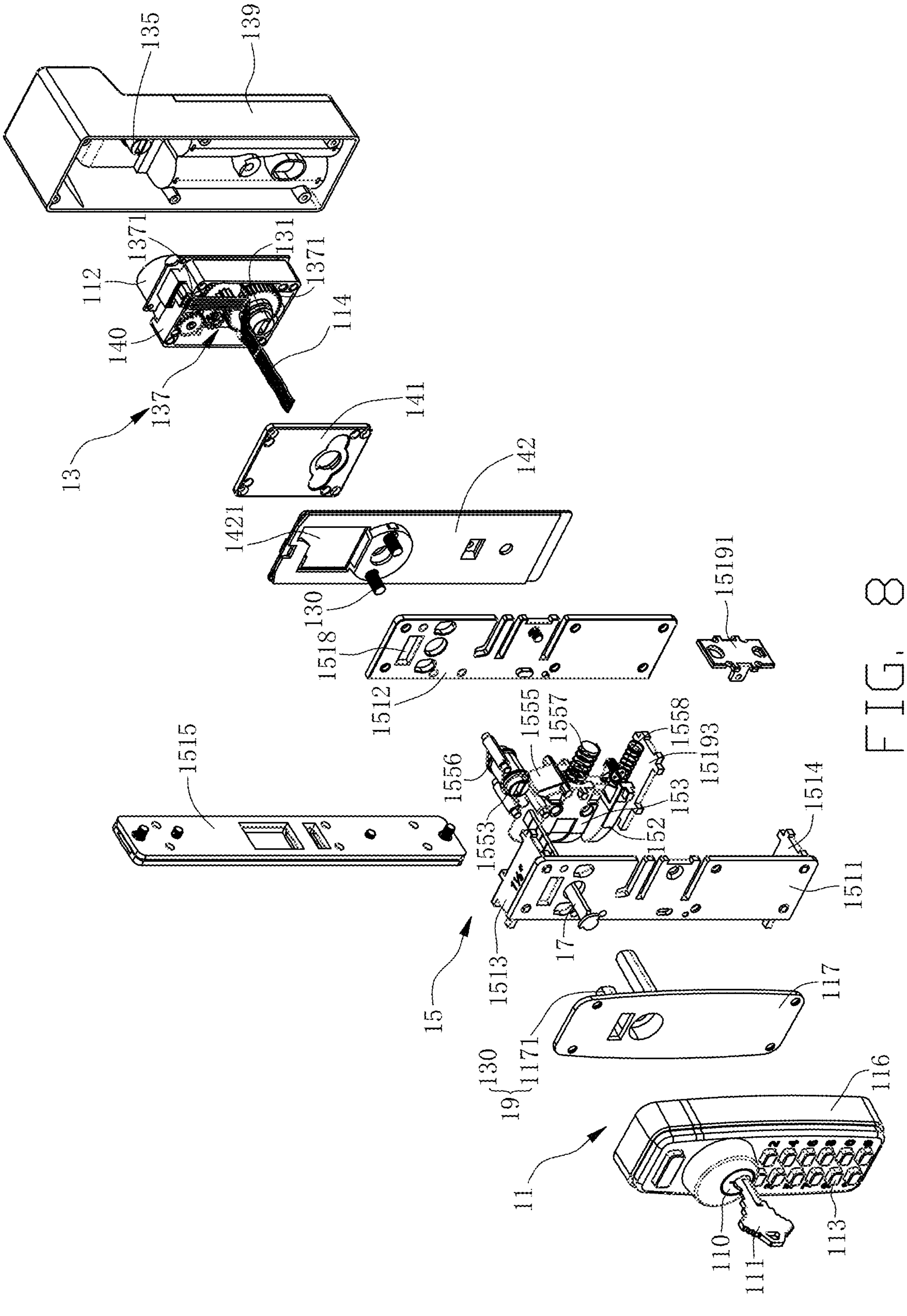
FIG. 8 is an exploded view of the replacement lock for stores door of FIG. 7 viewing from a direction.
Figure 9:
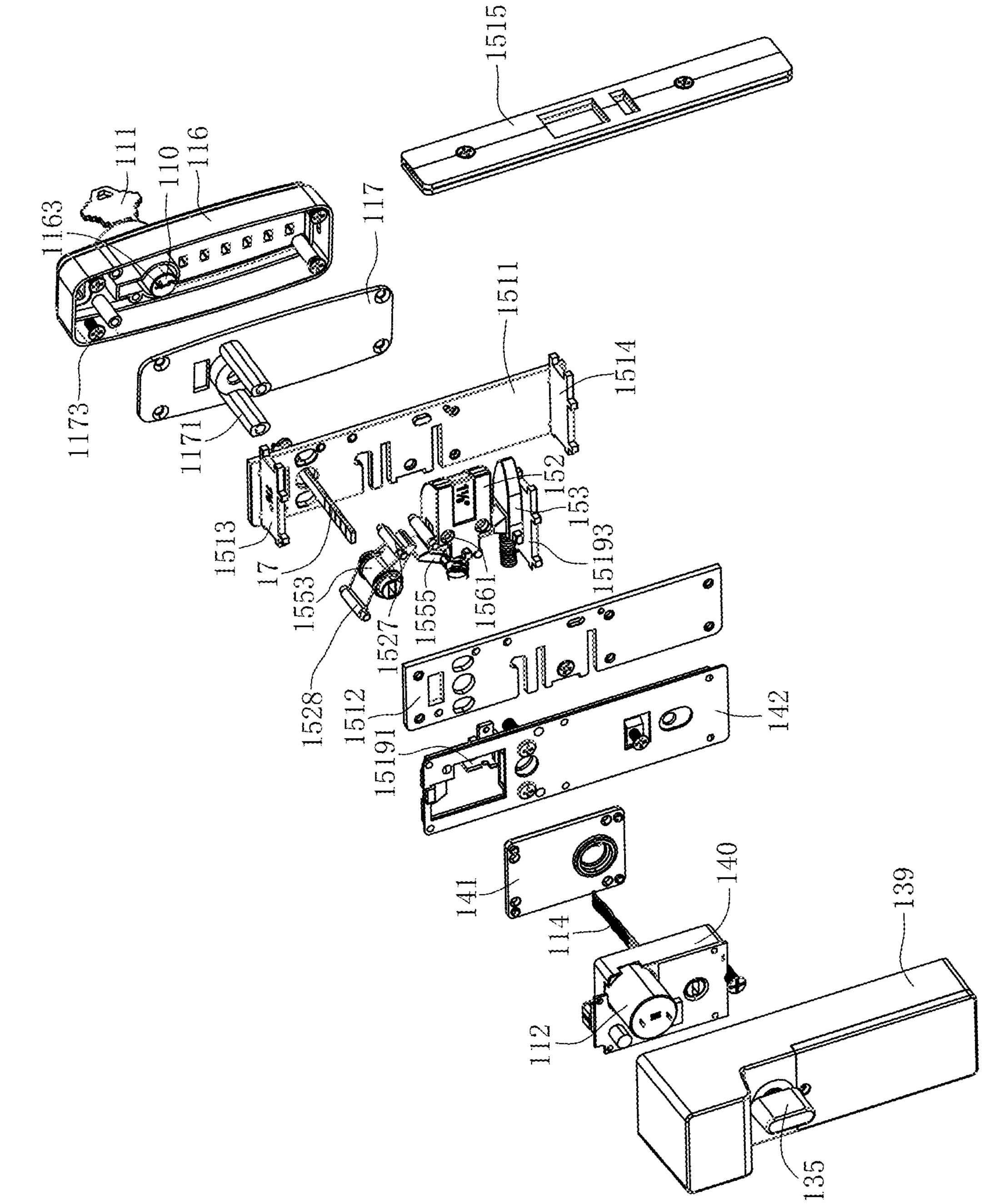
FIG. 9 is an exploded view of the replacement lock for stores door of FIG. 7 viewing from another direction.
Figure 10:
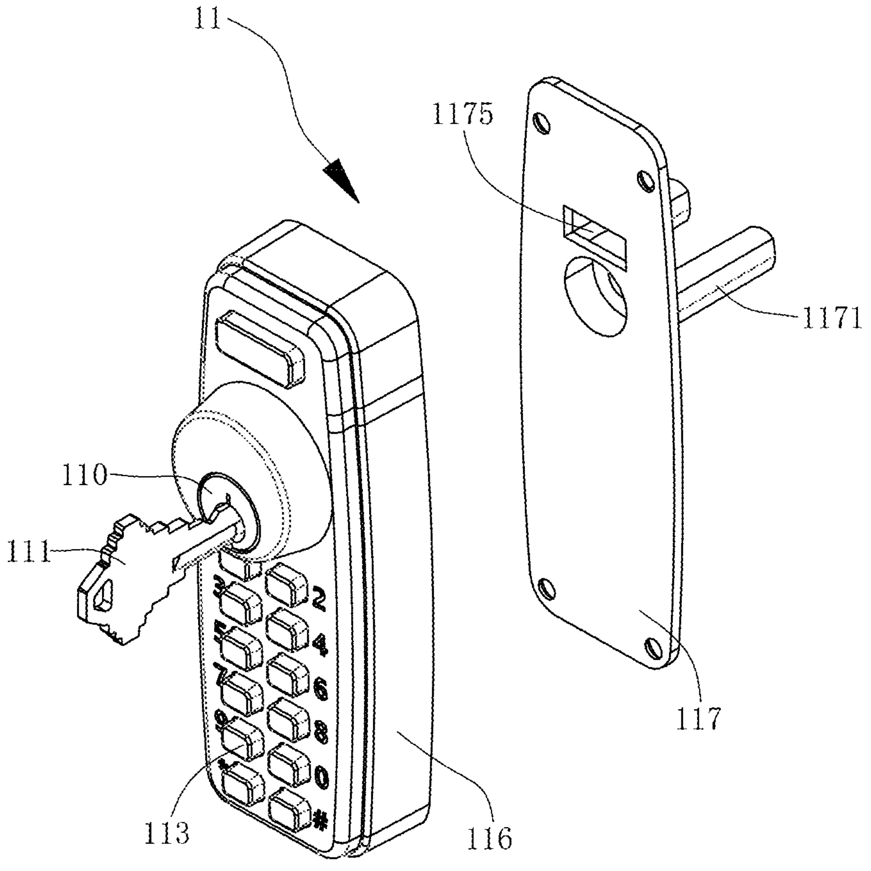
FIG. 10 is a schematic view of some components of FIG. 8.

Specifically, please referring to FIG. 8, FIG. 9 and FIG. 10, the outdoor component 11 includes an outer main housing 116 and an outer cover plate 117. The outer main housing 116 has an opening on one side, and the outer cover plate 117 covers the opening of the outer main housing 116. The lock cylinder 110 is located in the outer main housing 116. A protruding post 1163 is formed on the lock cylinder 110, and a first hole for the spindle 17 to pass through is defined in the outer cover plate 117. One end of the spindle 17 is provided with a base plate 171, which is provided with a notch 173, so that the base plate 171 is generally fan-shaped. The protruding post 1163 of the lock cylinder 110 is configured to abut against two end surfaces of the notch 173 of the base plate 171. When the lock cylinder 110 rotates, the protruding post 1163 on the lock cylinder 110 pushes the base plate 171 to rotate, that is, it drives the entire spindle 17 to rotate. The outer cover plate 117 is located on the side of the outer main housing 116 facing the mortise 15.

Specifically, the outer cover plate 117 may be fixedly connected to the outer main housing 116 via at least one first fastener 1173.

Specifically, the outer cover plate 117 is provided with a first through hole 1175 for the conductive wire 114 to pass through and extend into the outer main housing 116 to be electrically connected to the keypad 113.

Figure 11:
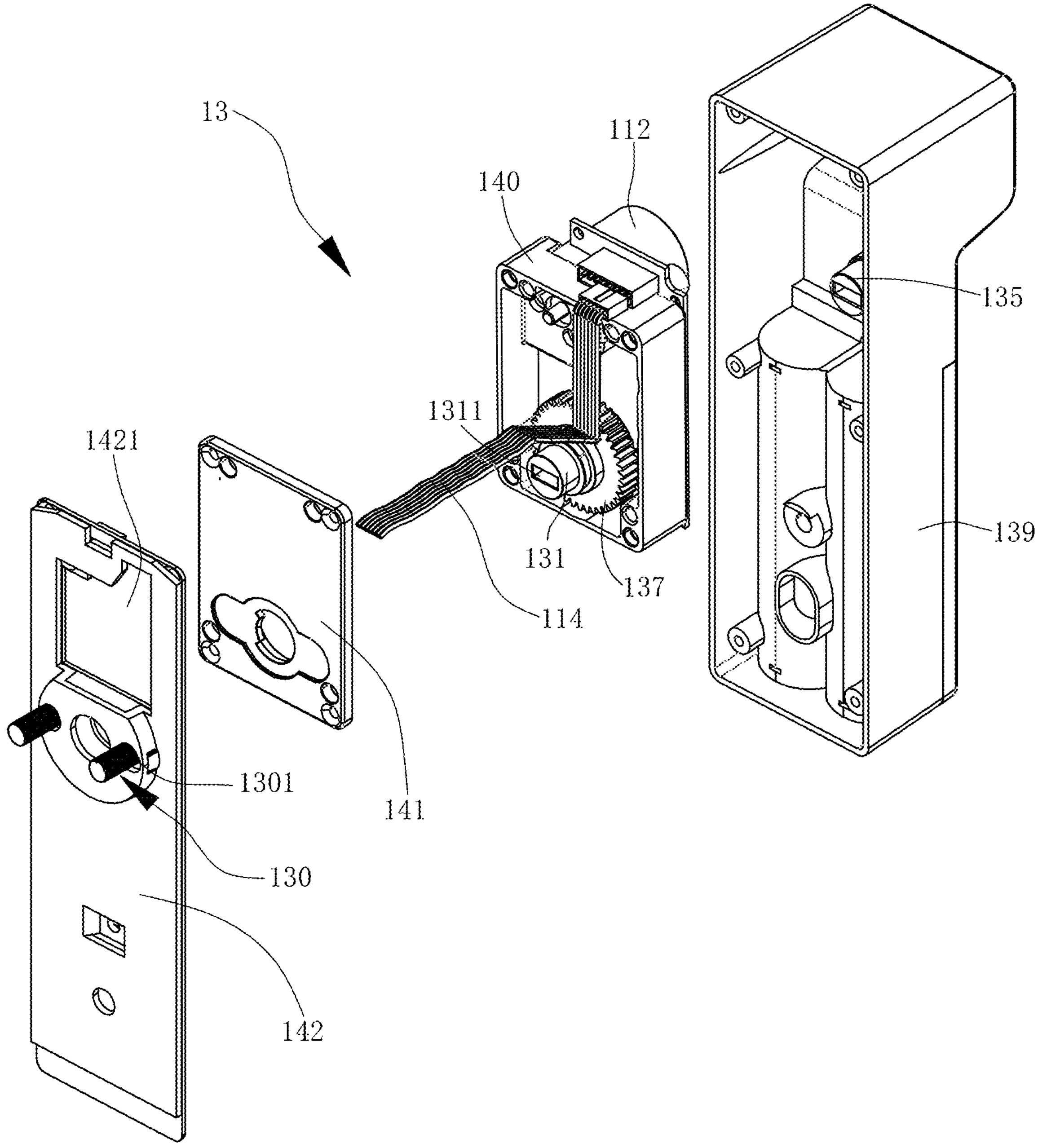
FIG. 11 is a schematic view of some other components of FIG. 8.
Figure 12:
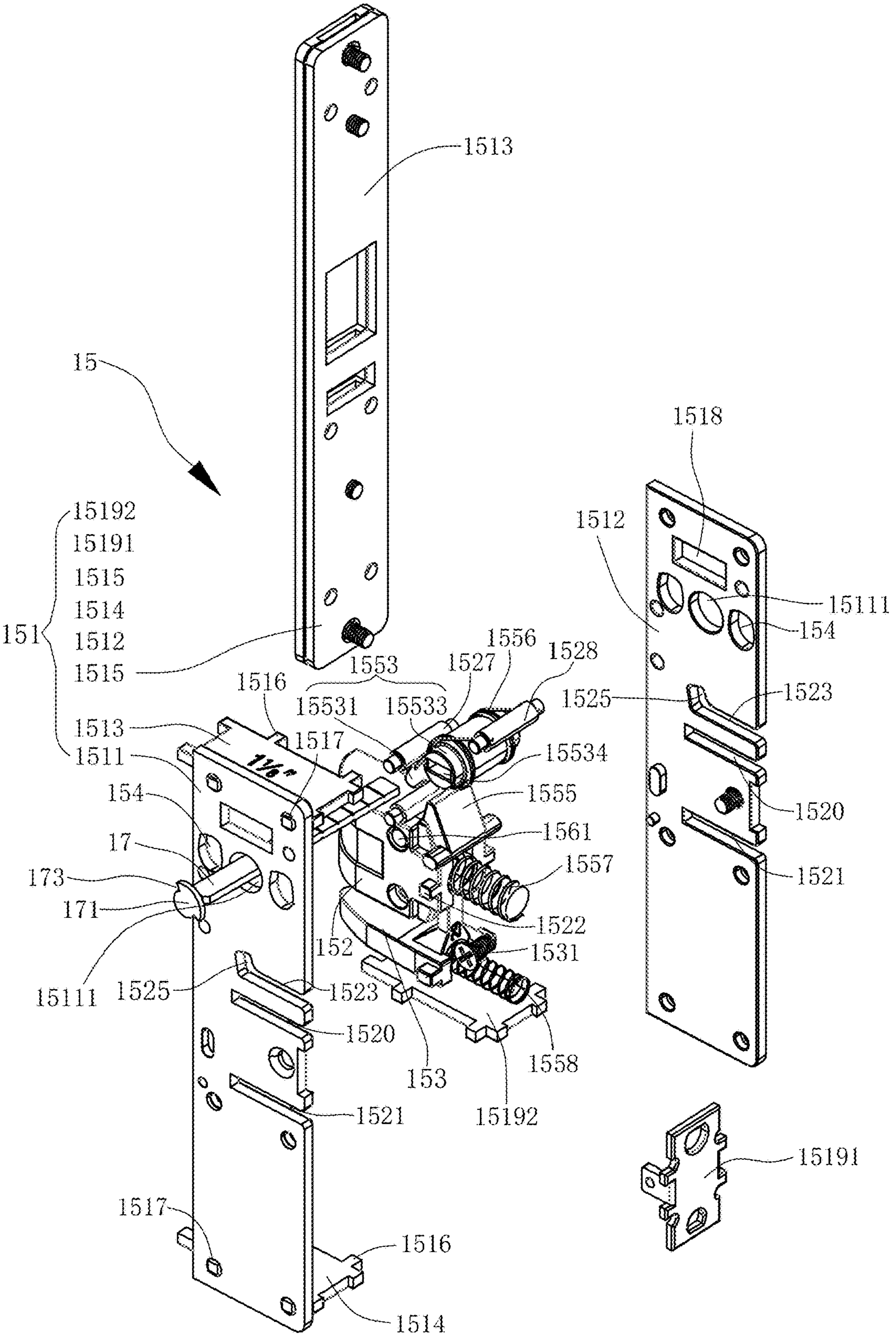
FIG. 12 is schematic view of some further components of FIG. 8.

In this embodiment, please referring to FIG. 8, FIG. 9 and FIG. 11, the indoor component 13 does not have a lock cylinder. The spindle 17 on the outdoor component 11 passes through the mortise 15 and is directly and detachably connected to the indoor component 13. Specifically, the spindle 17 inward from the outdoor component 11 through the mortise 15, and then is connected to the indoor component 13.

Specifically, the indoor component 13 may include a sleeve 131. After passing through the housing 151 of the mortise 15, the spindle 17 is directly and detachably connected to the sleeve 131 of the indoor component 13, thereby driving the rotation of the spindle 17. This design allows for convenient installation and disassembly. Specifically, the sleeve 131 is provided with an inserting hole 1311 having a cross-section corresponding to the spindle 17.

Certainly, in other embodiments, the indoor component 13 may be equipped with a lock cylinder that resists the spindle 17. The lock cylinder of the indoor component 13 may be other types of lock cylinder such as a pin tumbler lock, a disc tumbler lock, a magnetic lock, a smart card lock or a fingerprint lock etc. The present application does not intend to limit a type of lock cylinder of the indoor component 13, as long as it can meet the usage requirements of the lock. It should be understood that, since the spindle 17 is directly connected to the outdoor component 11 and the indoor component 13, the outdoor component 11 and the indoor component 13 may be coordinated with each other and may have different type of lock cylinder. For example, the outdoor component 11 may be an ordinary mechanical lock structure, while the indoor component 13 may be electronic lock such as an electronic password lock or an electronic fingerprint lock. Such a configuration enhances the convenience of locking and unlocking the indoor component 13 as an indoor lock, achieving a keyless lock structure design or electronic lock gear-driven locking or unlocking, thereby better meeting the usage requirements for replacing locks on commercial aluminum alloy shop door frames.

Specifically, the indoor component 13 may further include a second external force drive component 135 connected to the lock cylinder of the indoor component 13 or the other end of the spindle 17 of the indoor component 13. The second external force drive component 135 is configured to drive the lock cylinder or the spindle 17, thereby causing the spindle 17 to rotate in the first direction and consequently retracting the deadlatch 152. Specifically, the second external force drive component 135 may be a knob, a handle, or a motor, etc. and is sleeved on the lock cylinder of the indoor component 13 or the sleeve 131. The second external force drive component 135 is provided with an inserting hole having a cross-section corresponding to the spindle 17, enabling the second external force drive component 135 to drive the rotation of the spindle 17.

Specifically, the indoor component 13 includes an indoor transmission assembly 137. The motor 112 is transmissibly connected to the sleeve 131 via the indoor transmission assembly 137. When the motor 112 works, it drives the sleeve 131 to rotate via the indoor transmission assembly 137, thereby extending or retracting the deadlatch 152. An output shaft of the motor 112 may be connected to an input end of the indoor transmission assembly 137, and the sleeve 131 may be connected to an output end of the indoor transmission assembly 137. Specifically, the indoor transmission assembly 137 may include a plurality of gears 1371.

It should be understood that the indoor transmission assembly 137 may also be composed of other transmission structures such as a worm gear and a worm wheel.

Specifically, the indoor component 13 further includes an inner main housing 139, an inner sub-housing 140, an inner sub-cover 141, and an inner cover 142. The inner sub-cover 141 covers an opening of the inner sub-housing 140. The inner sub-housing 140 and the inner sub-cover 141 are located inside the inner main housing 139, and the inner cover 142 covers an opening of the inner main housing 139. The indoor transmission assembly 137 is located inside the inner sub-housing 140. The motor 112 is mounted outside the inner sub-housing 140, with its output shaft extending into the inner sub-housing 140 to connect with the indoor transmission assembly 137.

Specifically, the inner cover plate 142 is provided with a second through hole 1421 for the conductive wire 114 to pass through. The conductive wire 114 extends from a top outer side of the inner sub-housing 140 along the outer surface of the inner sub-cover 141 and then passes through the second through hole 1421.

In this embodiment, please referring to FIG. 8, FIG. 9 and FIG. 12 to FIG. 14, the mortise 15 includes a housing 151 fixedly mounted in the door panel 90 and the aforementioned deadlatch 152 movably disposed within the housing 151. When driven, the deadlatch 152 is capable of extending outward from the housing 151 or retracting into the housing 151 to achieve locking or unlocking. The housing 151 is mounted at an edge of the door panel 90. When the deadlatch 152 extends out of the housing 151, it also extends out of the door panel 90. When the deadlatch 152 retracts into the housing 151, it also retracts into the door panel 90. Specifically, the deadlatch 152 may be wedge-shaped.

Specifically, the mortise 15 further includes an auxiliary latch 153 that is movably mounted within the housing 151. When driven, the auxiliary latch 153 is capable of extending out of the housing 151 or retracting back into the housing 151 to achieve locking or unlocking. The housing 151 is mounted at the edge of the door panel 90. When the auxiliary latch 153 extends out of the housing 151, it also extends out from the door panel 90. When the auxiliary latch 153 retracts back into the housing 151, it also retracts back into the door panel 90. Specifically, the auxiliary latch 153 may be wedge-shaped. It should be understood that the auxiliary latch 153 may be omitted, and the door panel 90 can still be locked only using the main latch 152.

Specifically, the housing 151 includes a first side plate 1511, a second side plate 1512, a first connecting plate 1513, a second connecting plate 1514, and a front plate 1515. The first side plate 1511 and the second side plate 1512 are parallel and spaced apart. The first connecting plate 1513 and the second connecting plate 1514 are connected to the first side plate 1511 and the second side plate 1512 respectively to join them together. The front plate 1515 is located on the front side of the housing 151 and is configured to fixedly connected to the door panel 90. The first connecting plate 1513 and the second connecting plate 1514 may be disposed at two ends of the first side plate 1511 and the second side plate 1512 respectively. More specifically, two sides of the first connecting plate 1513 and the second connecting plate 1514 are provided with snap blocks 1516, and snap holes 1517 are defined in the first side plate 1511 and the second side plate 1512. The snap blocks 1516 are snapped into the snap holes 1517 to achieve the connection between the first side plate 1511, the second side plate 1512, the first connecting plate 1513, and the second connecting plate 1514. The front plate 1515 is provided with an opening to allow the deadlatch 152 and the auxiliary deadlatch 153 to extend therethrough.

Specifically, a third through hole 1518 is defined in each of the first side plate 1511 and the second side plate 1512 for allowing the conductive circuit 114 to pass through.

Specifically, the housing 151 further includes a rear plate 15191 and a third connecting plate 15193. Two ends of the third connecting plate 15193 are connected to the first side plate 1511 and the second side plate 1512 respectively, and the rear plate 15191 is connected to the third connecting plate 15193.

Specifically, the first side plate 1511 and/or the second side plate 1512 are provided with a first limiting groove 1520 and a second limiting groove 1521 extending along a direction of movement of the deadlatch 152. The first side plate 1511 and/or the second side plate 1512 are further provided with a guiding groove 1523.

In this embodiment, please referring to FIG. 8 to FIG. 11, the mortise 15 further includes a drive sleeve 1553 and a drive rod 1555. The spindle 17 is movably disposed within the housing 151. The drive sleeve 1553 is connected to the spindle 17 and is rotatably mounted inside the mortise 15 to drive the drive rod 1555 to slide, thereby moving the deadlatch 152 and the auxiliary deadlatch 153. The drive sleeve 1553 is configured to receive a driving force from either end of two ends of the spindle 17 to rotate. One side of the drive sleeve 1553 protrudes to engage and drive the drive rod 1555, thereby retracting the deadlatch 152 to achieve unlocking. Specifically, the drive sleeve 1553 is rotatably connected to two sides of the housing 151 (see FIG. 16). More specifically, the two ends of the drive sleeve 1553 are rotatably connected to the first side plate 1511 and the second side plate 1512 of the housing 151 respectively. Driven by an external force or a key, the spindle 17 can rotate, which in turn drives the drive sleeve 1553 to rotate and move the drive rod 1555, thereby moving the deadlatch 152 and the auxiliary deadlatch 153. The drive sleeve 1553 is configured to drive the deadlatch 152 and the auxiliary deadlatch 153 to retract through the drive rod 1555 when rotating around the first direction. Specifically, in this embodiment, the drive sleeve 1553 and the drive rod 1555 are separately disposed. The drive rod 1555 may be located on the rotation path of the drive sleeve 1553. In this way, when the drive sleeve 1553 rotates to a position where it contacts the drive rod 1555 and continues to rotate, it can drive the drive rod 1555 to move. In the first embodiment, the spindle 17 is directly connected to the drive sleeve 1553. In other embodiments, the spindle 17 may be indirectly connected to the drive sleeve 1553. For example, gear teeth may be provided on an outer periphery of both the spindle 17 and the drive sleeve 1553, and the spindle 17 and the drive sleeve 1553 may be connected through meshed gears.

Specifically, the mortise 15 further includes a first reset component 1556 mounted on the drive sleeve 1553. The first reset component 1556 is configured to provide a restoring force that drives the drive sleeve 1553 to rotate along a second direction opposite to the first direction, thereby causing the spindle 17 to rotate in the second direction and separating the drive sleeve 1553 from the drive rod 1555. When the driving force on the spindle 17 is removed, the first reset component 1556 mounted on the drive sleeve 1553 drives the drive sleeve 1553 to reset along the second direction. Specifically, the first reset component 1556 may be an elastic element, such as a torsion spring. One end of the torsion spring is fixed relative to the drive sleeve 1553, and the other end is fixed relative to the housing 151. The first reset component 1556 is pre-tensioned after installation. The housing 151 is further provided with a fixing post 1527, one end of the first reset component 1556 is fixed to the drive sleeve 1553, and the other end is fixed to the fixing post 1527.

Specifically, the mortise 15 further includes a second reset component 1557 and a third reset component 1558. The second reset component 1557 is configured to provide a restoring force that extends the deadlatch 152 outward from the mortise 15, and the third reset component 1558 is configured to provide a restoring force that extends the auxiliary deadlatch 153 outward from the mortise 15. When the driving force on the spindle 17 is removed, the deadlatch 152 extends and resets under the action of the second reset component 1557 connected to the deadlatch 152, and the auxiliary deadlatch 153 extends and resets under the action of the third reset component 1558 connected to the auxiliary deadlatch 153. The second reset component 1557 is configured to drive the deadlatch 152 to move and extend out of the housing 151 of the mortise 15, and the third reset component 1558 is configured to drive the auxiliary deadlatch 153 to extend out of the housing 151 of the mortise 15. Specifically, the second reset component 1557 and the third reset component 1558 may be elastic elements, such as extension springs. Certainly, the second reset component 1557 and the third reset component 1558 may also be electromagnets that generate magnetic force to extend the deadlatch 152 when electrified. The second reset component 1557 and the third reset component 1558 are pre-compressed after installation. One end of the second reset component 1557 and the third reset component 1558 abuts the rear plate 15191. When the second reset component 1557 and the third reset component 1558 are provided, the extension of the deadlatch 152 and the auxiliary deadlatch 153 does not require the assistance of the second external force drive component 135 of the indoor component 13 and the first external force drive component of the outdoor component 11. When the external force acting on the deadlatch 152 and the auxiliary deadlatch 153 is removed (that is, the first external force drive component and the second external force drive component 135 are released to remove the force on the spindle 17), the restoring force of the second reset component 1557 and the third reset component 1558 can automatically drive the deadlatch 152 and the auxiliary deadlatch 153 to extend out of the housing 151 of the mortise 15.

Specifically, a first limiting block 1522 is formed on the deadlatch 152 to movably positioned within the first limiting groove 1520, and a second limiting block 1531 is formed on the auxiliary deadlatch 153 to movably positioned within the second limiting groove 1521. As such, extension lengths (i.e., stroke) of the deadlatch 152 and the auxiliary deadlatch 153 can be defined. By defining positions of the first limiting groove 1520 and the second limiting groove 1521, it is very easy to define the stroke of the deadlatch 152 and the auxiliary deadlatch 153 to meet the dimensional requirements when replacing the old lock. Also, the first limiting groove 1520 and the second limiting groove 1521 may also serve as guide grooves to guide the movement of the deadlatch 152 and the auxiliary deadlatch 153.

Figure 13:
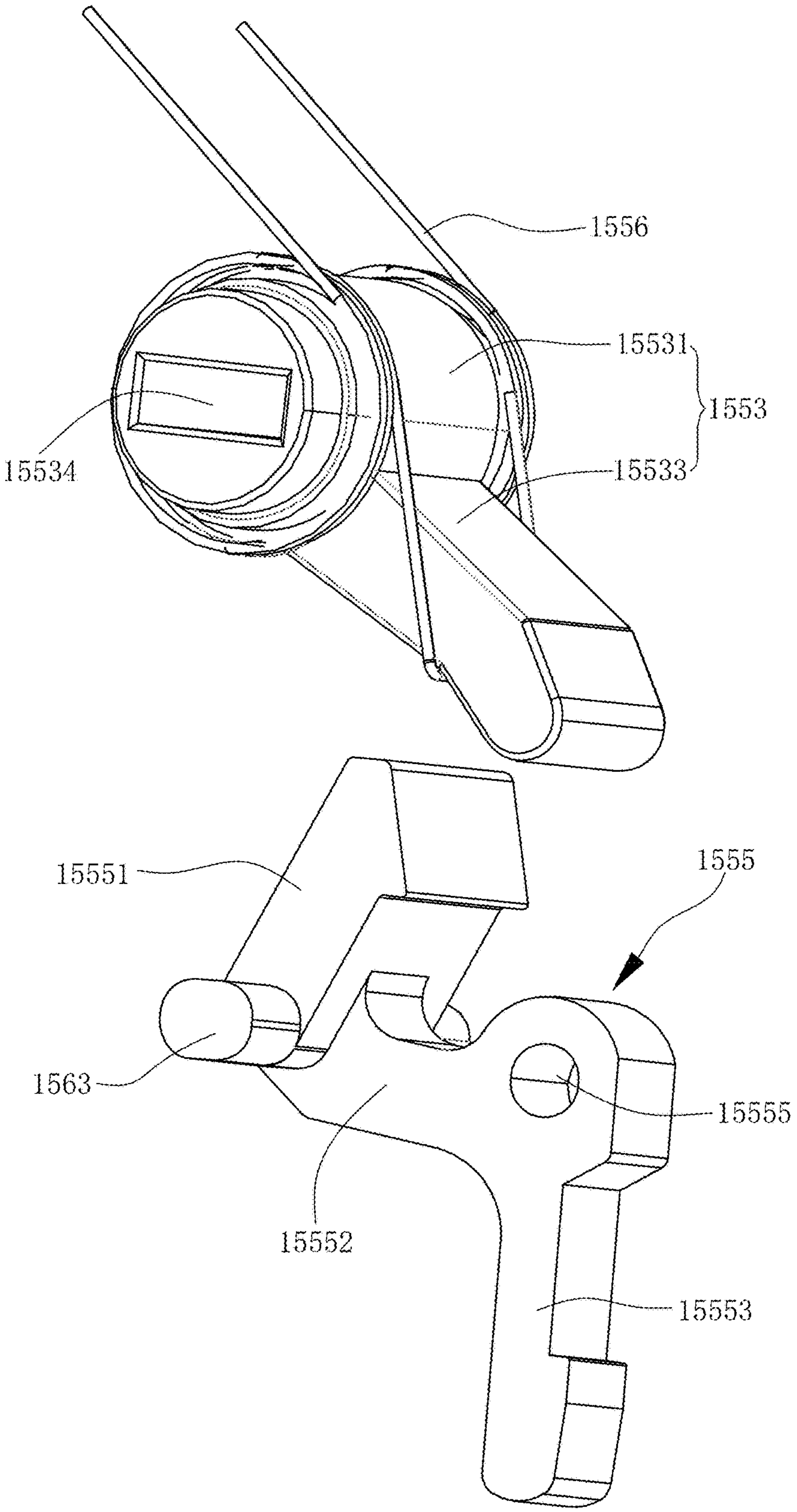
FIG. 13 is a schematic view of a drive sleeve, a drive rod and a first reset member of the replacement lock for stores door of FIG. 4.
Figure 14:
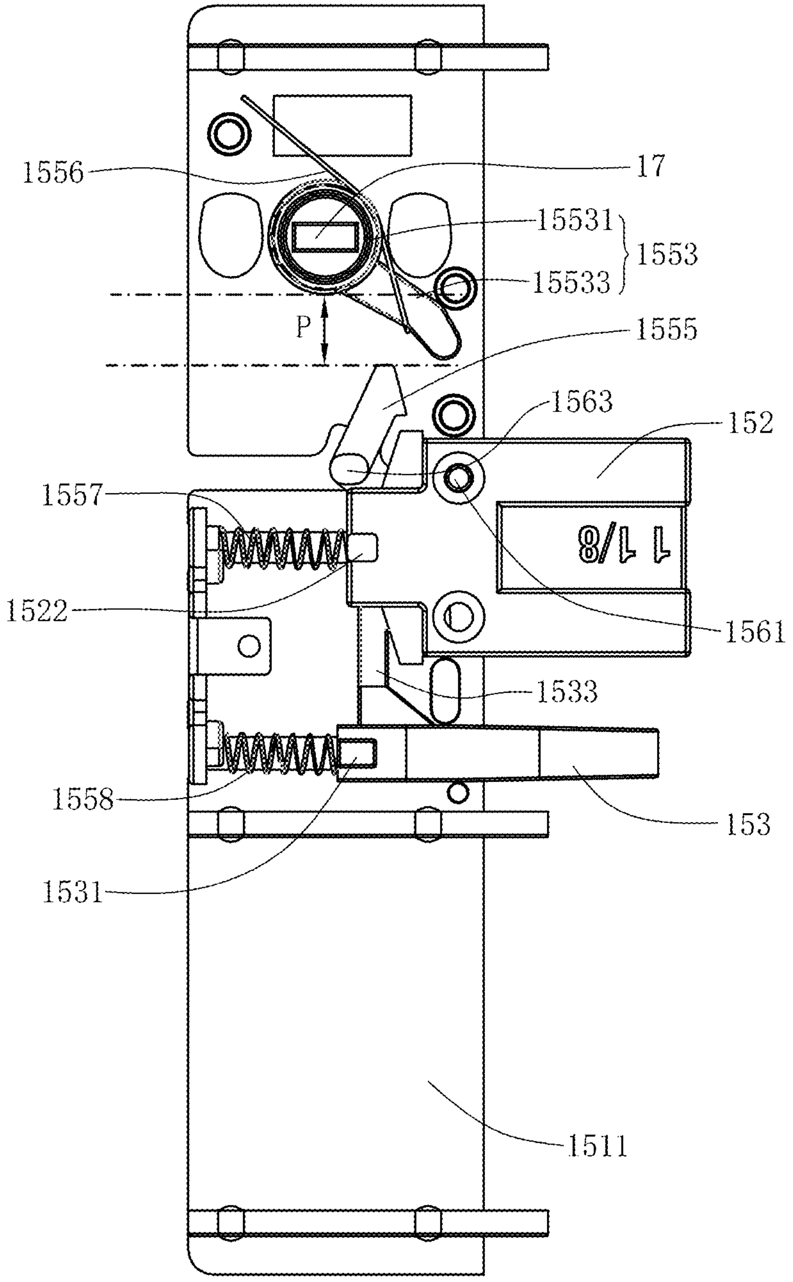
FIG. 14 is a plane view of some components of the replacement lock for stores door.

Specifically, please referring to FIG. 13, the drive sleeve 1553 may include a sleeve tube 15531 and a rod 15533 connected to the sleeve tube 15531. The sleeve tube 15531 may have a coupling hole 15534 non-rotatably engaged with the spindle 17. The spindle 17 passes through the coupling hole 15534, and the sleeve tube 15531 is able to rotate together with the rotation of the spindle 17. The rod 15533 is configured to drive the deadlatch 152 to move with the rotation of the sleeve tube 15531. Furthermore, the rod 15533 protrudes from one side of an outer periphery of the sleeve tube 15531. The rod 15533 rotates within a certain range with the rotation of the drive sleeve 15531, to engage with or separate from the drive rod 1555. Specifically, the rod 15533 may be connected to a circumferential side surface of the sleeve tube 15531. As an alternative embodiment, the rod 15533 may extend radially outward from an end surface of the sleeve tube 15531 and protrude from the side surface of the sleeve tube 15531. This can also achieve the rotation of the rod 15533 together with the sleeve tube 15531, thereby moving the deadlatch 152. The housing 151 is further provided with a limiting post 1528 to restrict the rotation range of the drive sleeve 1553.

Preferably, a cross-sectional shape of the coupling hole 15534 corresponds to a cross-sectional shape of the spindle 17, that is, the coupling hole 15534 and the spindle 17 are matched in shape. The present application does not restrict the cross-sectional shapes of the coupling hole 15534 and the spindle 17. For example, the cross-sectional shapes of the coupling hole 15534 and the spindle 17 may be rectangular or square. Alternatively, the cross-sectional shapes of the coupling hole 15534 and the spindle 17 may be cross-shaped, etc. It should be understood that the coupling hole 15534 and the spindle 17 may also be non-shape-matched, so long as an inner wall of the sleeve tube 15531 has a limiting structure for limiting the clockwise and counter-clockwise rotation of the spindle 17 to achieved a transmission connection between the spindle 17 and the sleeve tube 15531 (i.e., the drive sleeve 1553).

Regarding the rod 15533, it may be in the form of a plate, a sheet (see FIG. 8), or a block, as long as the rod 15533 can engage and drive the drive rod 1555 during rotation.

Specifically, as shown in FIG. 13, the drive rod 1555 includes a first part 15551, a second part 15552 and a third part 15553. Two ends of the second part 15552 are connected to the first part 15551 and the third part 15553 respectively. The first part 15551 is oriented towards the drive sleeve 1553, and the third part 15553 is oriented towards the auxiliary deadlatch 153. The drive rod 1555 is further connected to the deadlatch 152. More specifically, the first part 15551 and the third part 15553 extend towards two sides of the second part 15552 respectively, and a certain angle is defined between the second part 15552 and each of the first part 15551 and the third part 15553. A shaft hole 15555 is further defined in the drive rod 1555, and the drive rod 1555 is rotatably connected to the deadlatch via a connecting shaft 1561 inserted into the shaft hole 15555. A protrusion 1563 movably accommodated within the guide groove 1523 of the housing 151 is further formed on the drive rod 1555. A recess 1525 concave towards the drive sleeve 1553 is defined in one end of the guide groove 1523, and the drive rod 1555 can rotate around the connecting shaft 1561 relative to the deadlatch 152. When the deadlatch 152 is in the extended position, at least a part of the protrusion 1563 is capable of being located within the recess 1525. More specifically, the shaft hole 15555 may be defined at the connecting position between the second part 15552 and the third part 15553, and the protrusion 1563 may be provided at the connecting between the first part 15551 and the second part 15552.

Specifically, one side of the auxiliary deadlatch 153 is provided with an extension portion 1533, which corresponds to the third part 15553. When the drive rod 1555 moves to left, the extension portion 1533 comes into contact with the third part 15553, thereby being moved by the drive rod 1555.

In this embodiment, the replacement lock for stores door further includes an installation fixing component 19. A middle part of the installation fixing component 19 passes through an installation hole 154 of the mortise 15. Two ends of the installation fixing component 19 are fixedly connected to the outdoor component 11 and the indoor component 13 respectively. Each of the first side plate 1511 and the second side plate 1512 defines two installation holes 154 and an inserting hole 15111 between the two installation holes 154. The installation holes 154 and the inserting hole 15111 are aligned along a direction parallel to a moving direction of the deadlatch 152. In a direction perpendicular to the moving direction of the deadlatch 152, a gap P is defined between the sleeve tube 15531 of the drive sleeve 1553 and the drive rod 1555. That is, the sleeve tube 15531 is disposed above the drive rod 1555.

Specifically, the installation and fixing component 19 may include a screw 130 formed on the indoor component 13. The screw 130 may have a threaded portion 1301 for connecting with the outdoor component 11. The threaded portion 1301 is configured to be screw-connected with the outdoor component 11 to achieve the positioning installation between the indoor component 13 and the outdoor component 11. External threads are formed on the threaded portion 1301.

As a first possible embodiment of the installation fixing component 19 in this application, the installation fixing component 19 may further include an installation post 1171, one end of which is formed on the outdoor component 11. Another end of the installation post 1171 may pass through the installation hole 154 of the mortise 15 and be screw-connected with the screw 130. The installation post 1171 passes through the mortise 15 and is connected with the screw 130, which makes the installation more firmly and also avoids the damage to the outdoor component 11 in case the screw 130 is directly installed on the outdoor component 11.

As a second possible embodiment of the installation fixing component 19 in this application, the screw 130 on the indoor component 13 passes through the installation hole 154 of the mortise 15 and is screw-connected with a screw hole on the outdoor component 11 (At this time, the installation post 1171 on the outdoor component 11 may be omitted, and a screw hole may be directly defined in the outdoor component 11). As such the outdoor component 11, the indoor component 13, and the mortise 15 are axially connected and fixed to the door panel 90. Certainly, in some other embodiments, the outdoor component 11 may also be provided with an installation post 1171. Internal threads are defined in the installation post 1171, and the screw 130 passes through the mortise 15 and is connected with the installation post 1171. This arrangement prevents the outdoor component 11 from being damaged when the screw 130 is directly installed on the outdoor component 11.

It should be understood that the number of screws 130 and installation posts 1171 are equal. The number of screws 130 and installation posts 1171 is one each, and the number of installation holes 154 on the mortise 15 is one, which can reduce costs. Alternatively, several screws 130 and installation posts 1171 in equal numbers may be provided. The installation holes 154 on the mortise 15 are correspondingly set for the screws 130 and installation posts 1171 (the installation holes 154 on the mortise 15 are aligned with the screws 130 and installation posts 1171 along the axis of the spindle 17), and the number of installation holes 154 on the mortise 15 is multiple. This not only facilitates the positioning of the outdoor component 11 and the indoor component 13 more conveniently, but also makes the connection between the outdoor component 11 and the indoor component 13 more secure.

When the user unlocks a door via the outdoor component 11, a first torque in the first direction may be applied to the spindle 17 via the key 111 (or in other embodiments, via a knob or a handle connected to the spindle 17 as the first external force drive component), the motor 112 (i.e., via an electronic password). Under action of this first torque in the first direction, the spindle 17 drives the drive sleeve 1553 to rotate along the first direction to drive the drive rod 1555 to move in a third direction. This action causes the deadlatch 152 to retract into the mortise 15, disengaging from the lock slot of the locked object, thereby unlocking the door panel 90 from the locked object. When the user unlocks a door via the indoor component 13, under action of a second torque in the first direction, the second external force drive component 135 rotates in the first direction. This rotation drives the spindle 17 to rotate in the first direction to drive the drive sleeve 1553 to rotate along the first direction, causing the deadlatch 152 to retract into the mortise 15 and disengage from the lock slot of the object to be locked, thereby unlocking the door panel 90 from the object to be locked.

When locking, when the first external force drive component or the second external force drive component 135 revokes the drive of the spindle 17 along the first direction, the drive sleeve 1553 will rotate in the second direction opposite to the first direction and reset under the action of the first reset component 1556, and disengage from the drive rod 1555. The restoring forces of the second reset component 1557 and the third reset component 1558 push the deadlatch 152 and the auxiliary deadlatch 153 to extend out of the housing 151 of the mortise 15 respectively to engage with the lock slot of the locked object, thereby locking the door panel 90 to the locked object.

In the mortise and the replacement lock for stores door of this embodiment, the arrangement of the drive sleeve coupled with the mortise, allows for easy design of the relative position between the lock hole and the extended position of the deadlatch, as well as the overall size of the mortise. Moreover, it can conveniently re-find the center point, torque, and rotation angle with a high degree of consistency with the old lock. Therefore, the replacement lock for stores door of this application can conveniently replace the old lock without the need to drill new holes in the door.

Second Embodiment

Figure 15:
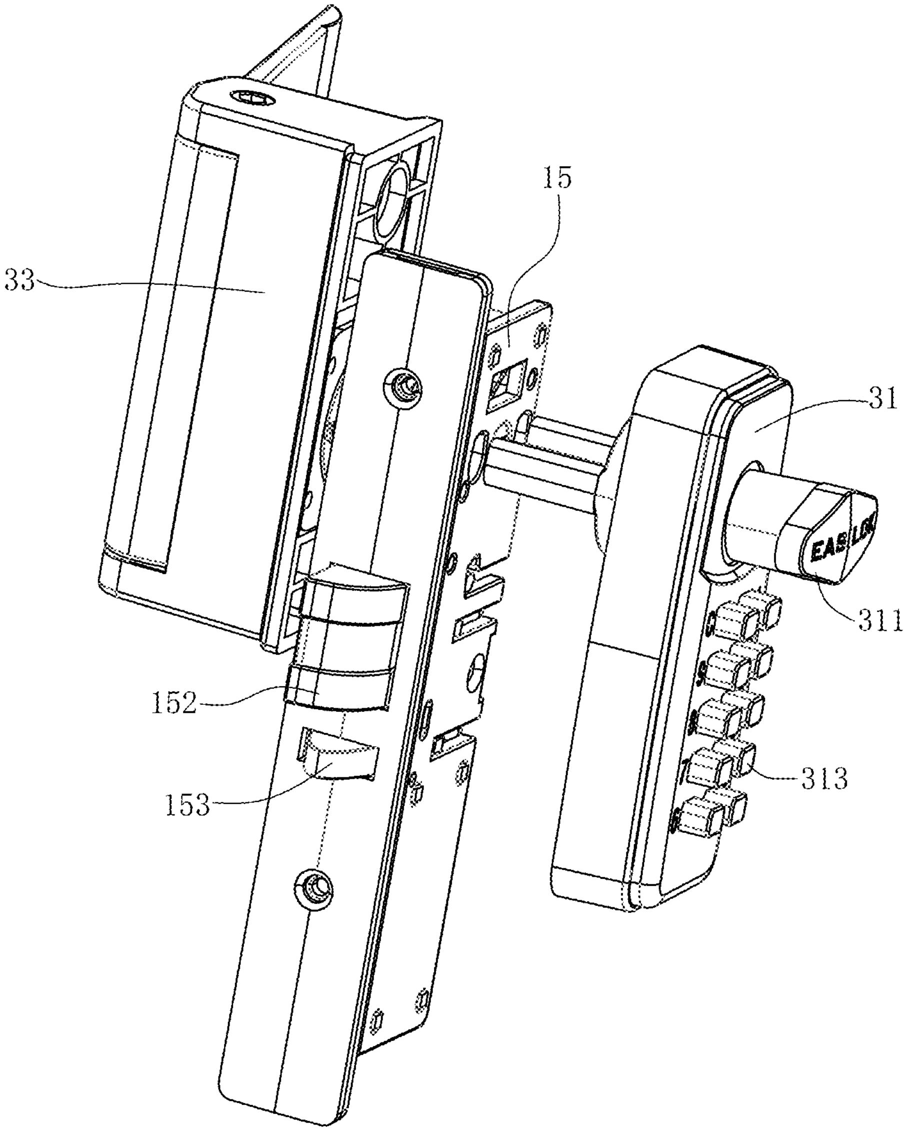
FIG. 15 is schematic, assembled view of a replacement lock for stores door according to a second embodiment of the present disclosure installed in a door panel.
Figure 16:
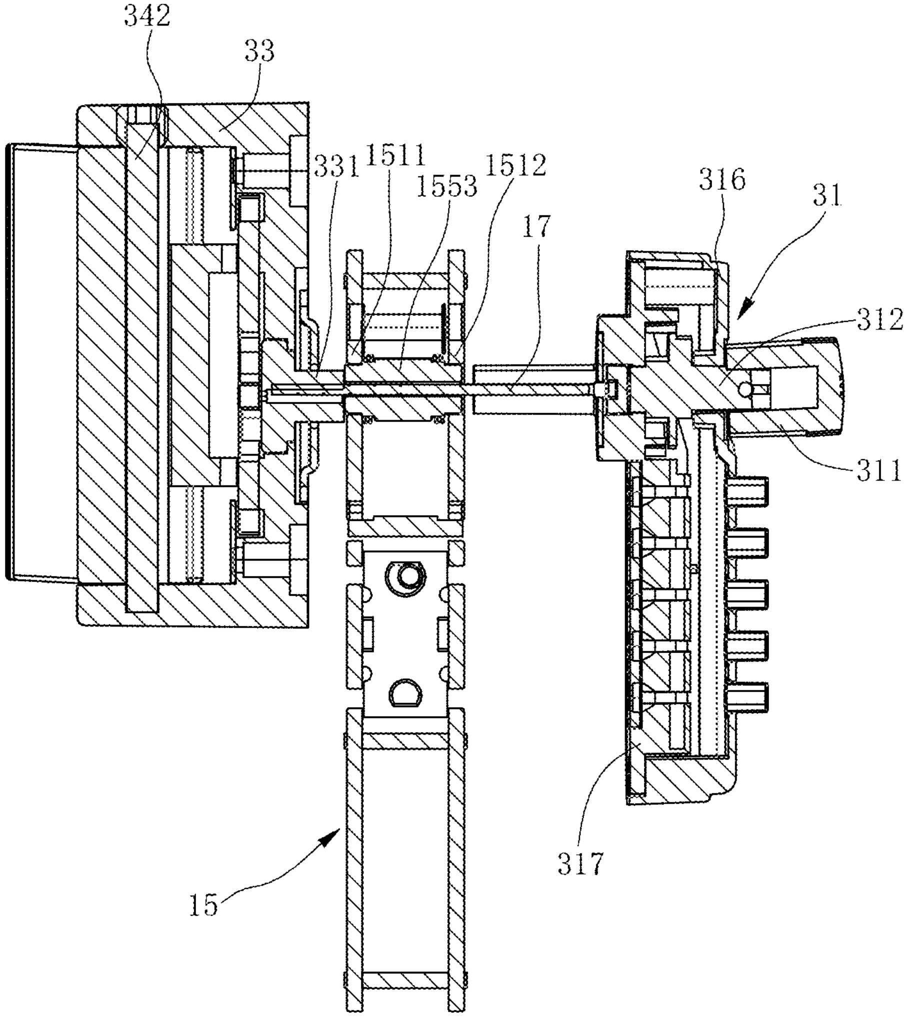
FIG. 16 is a sectional view of FIG. 15.
Figure 17:
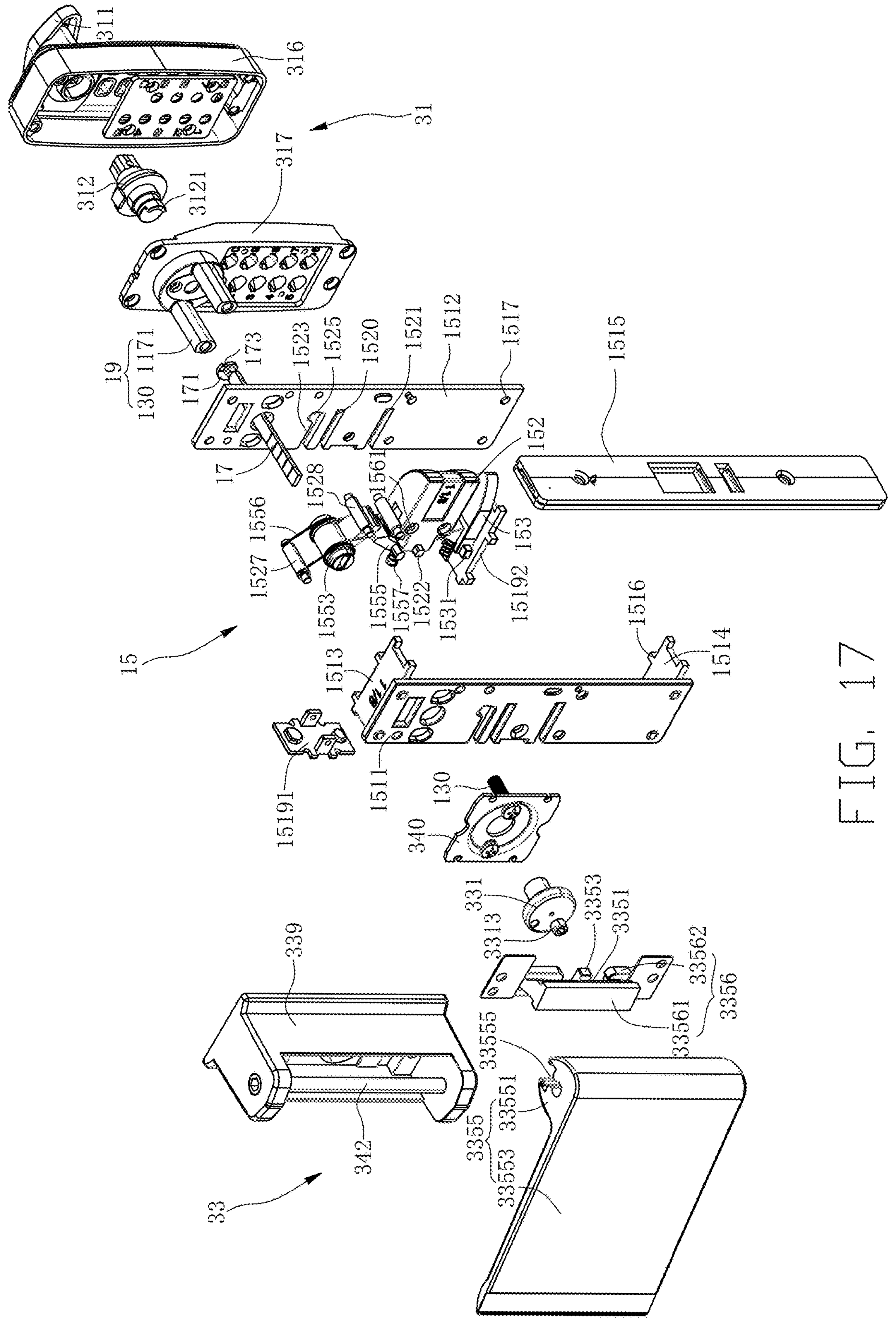
FIG. 17 is an exploded view of the replacement lock for stores door of FIG. 15 viewing from a direction.
Figure 18:
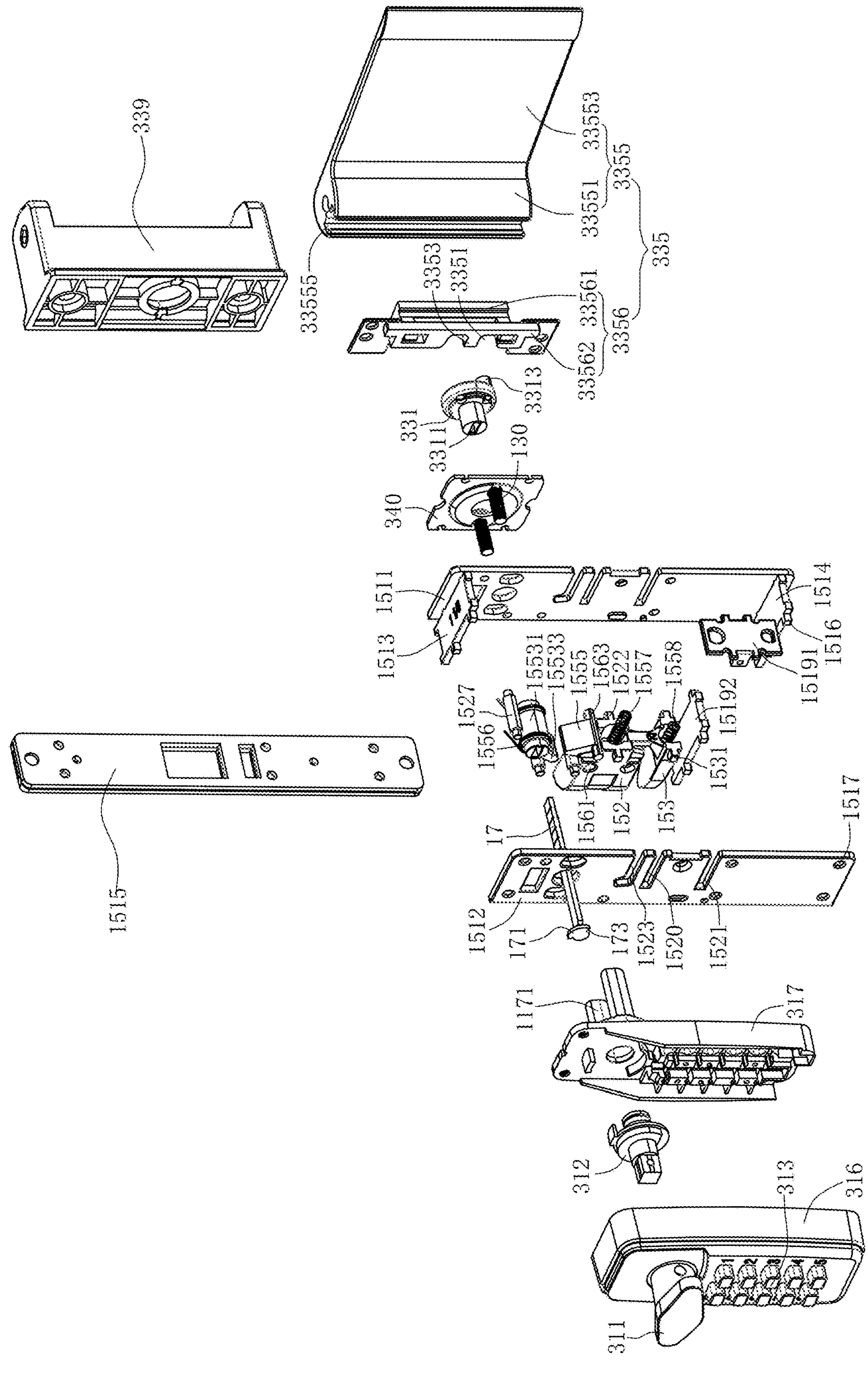
FIG. 18 is an exploded view of the replacement lock for stores door of FIG. 15 viewing from another direction.
Figure 19:
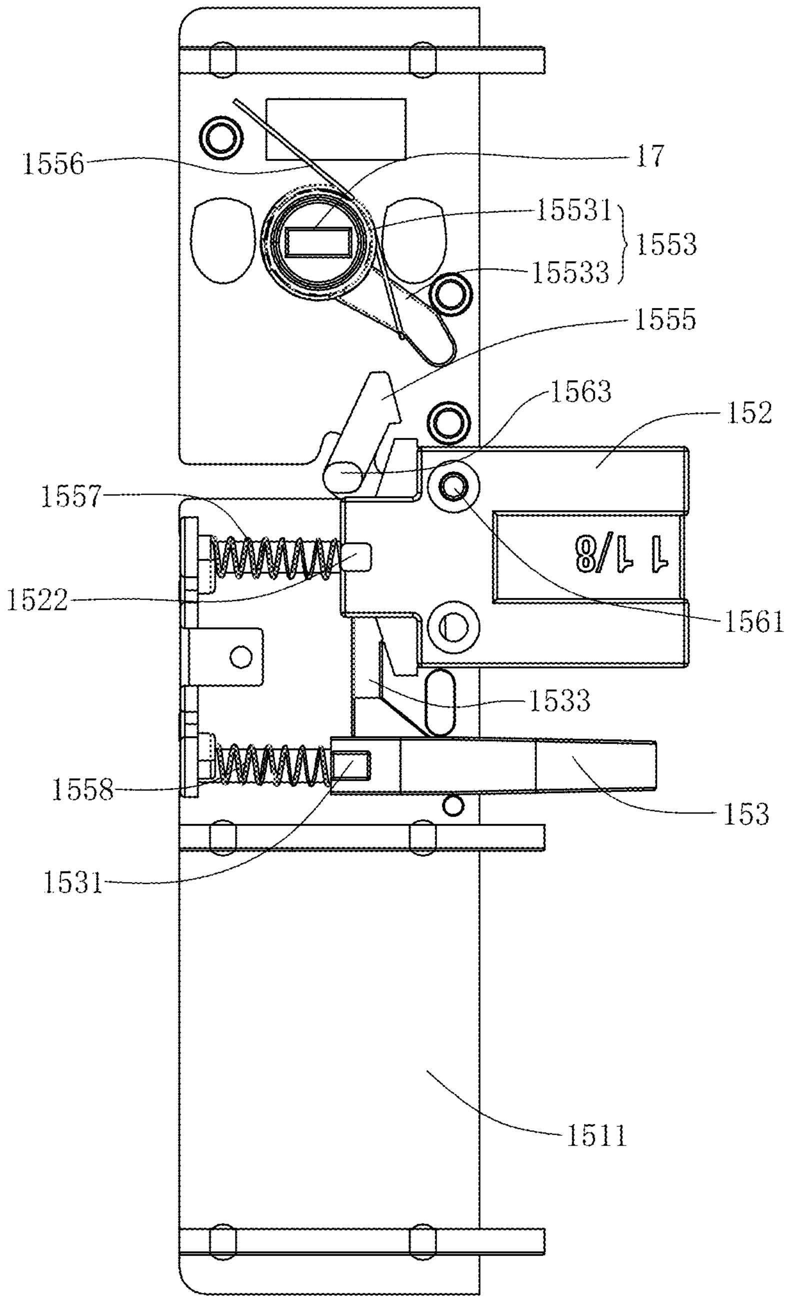
FIG. 19 is a plane view of some components of the replacement lock for stores door of FIG. 15.

Please referring to FIG. 15 and FIG. 16, a replacement lock for stores door 80' in the second embodiment of the present application includes an outdoor component 31, an indoor component 33, a mortise 15, and a spindle 17. The outdoor component 31 is installed on an outer side of the door panel. The indoor component 33 is installed on an inner side of the door panel (not shown in the FIGs). The outer and inner sides of the door panel are opposite sides. Generally, when the door panel is in use, the side facing the interior is considered the inner side, and the side facing the exterior is considered the outer side. Please referring to FIG. 17 to FIG. 19, the structure of the mortise 15 and the installation and fixing component 19 in the second embodiment is the same as that of the mortise 15 and the installation and fixing component 19 in the first embodiment, and will not be repeated here.

In this embodiment, the outdoor component 31 does not have a lock cylinder. Certainly, the outdoor component 31 may further include a lock cylinder, which may be a pin tumbler lock, a leaf lock, a magnetic lock, a smart card lock, a fingerprint lock, etc.

Specifically, the outdoor component 31 may further include a first external force drive component connected to the spindle 17. The first external force drive component is configured to drive the spindle 17, thereby causing the spindle 17 to rotate in the first direction and consequently extending or retracting the deadlatch 152 of the mortise 15. Specifically, the first external force drive component can be a knob, handle, or motor, etc., and is sleeved on the lock cylinder of the outdoor component 31. In this embodiment, the first external force drive component includes a knob 311 connected to the mortise 1511. The outdoor component 31 further includes a keypad 313. When a correct password is entered into the keypad 313, the knob 311 can be rotated. If the password entered into the keypad 313 is incorrect, the knob 311 cannot be rotated (this structure, where the knob can be turned if the password is correct and cannot be turned if the password is incorrect, is similar to the structure of a mechanical password lock with an ordered keypad as disclosed in the Chinese patent application published on Apr. 22, 2025, with the publication number CN 119860118A, and will not be further detailed described here). Users can turn the knob 311 to extend or retract the deadlatch 152. In this way, a keyless lock structure is achieved. That is to say, the replacement lock for stores door 80' for shop doors in this embodiment is a mechanical password lock.

Specifically, the outdoor component 31 includes an outer main housing 316 and an outer cover plate 317. The outer main housing 316 has an opening on one side, and the outer cover plate 317 covers the opening of the outer main housing 316. The outer cover plate 317 is provided with a first hole for the spindle 17 to pass through. One end of the spindle 17 is provided with a base plate 171, which is provided with a notch 173, so that the base plate 171 is generally fan-shaped. One end of the knob 311 is fixedly connected to a locking member 312, which is provided with a protruding post 3121. The protruding post 3121 is configured to abut against two end surfaces of the notch 173 of the base plate 171. When the knob 311 rotates, the protrusion 3121 pushes the base plate 171 to rotate, thereby driving the entire spindle 17 to rotate. The outer cover plate 317 is located on the side of the outer main housing 316 facing the mortise 15.

In this embodiment, the indoor component 33 does not have a lock cylinder. The spindle 17, which is connected to the outdoor component 31, passes through the mortise 15 and is directly and detachably connected to the indoor component 33.

Specifically, the indoor component 33 may include a sleeve 331. After passing through the housing 151 of the mortise 15, the spindle 17 is directly and detachably connected to the sleeve 331 of the indoor component 33, thereby driving the spindle 17 to rotate. This design allows for convenient installation and removal. Specifically, the sleeve 331 is provided with an inserting hole 3311 having a cross-section corresponding to the spindle 17.

Certainly, in other embodiments, the indoor component 33 may be equipped with a lock cylinder that resists the spindle 17. The lock cylinder of the indoor component 33 may be other types of lock cylinder structures such as a pin tumbler lock, a disc tumbler lock, a magnetic lock, a smart card lock, a fingerprint lock. The present application does not intent to limit the type of lock cylinder structure of the indoor component 33, as long as it can meet the usage requirements of the lock. It should be understood that, since the spindle 17 is directly connected to the outdoor component 31 and the indoor component 33, the outdoor component 31 and the indoor component 33 can be coordinated with each other and may have different type of lock cylinder. For example, the outdoor component 31 may be a common mechanical lock structure, while the indoor component 33 may be electronic lock such as an electronic password lock or an electronic fingerprint lock. Such a configuration enhances the convenience of locking and unlocking the indoor component 33 as an indoor lock, achieving a keyless lock structure design or electronic lock gear-driven locking or unlocking, thereby better meeting the usage requirements for replacing locks on commercial aluminum alloy shop door frames.

Specifically, the indoor component 33 may further include a second external force drive component 335 connected to the lock cylinder of the indoor component 33 or the other end of the spindle 17 of the indoor component 33. The second external force drive component 335 is configured to drive lock cylinder or the spindle 17, thereby causing the spindle 17 to rotate in the first direction and consequently retracting the deadlatch 152. Specifically, the second external force drive component 335 may be a knob, handle, or motor, etc. and is sleeved on the lock cylinder of the indoor component 13 or the sleeve 331. The second external force drive component 335 is provided with an inserting hole having a cross-section corresponding to the spindle 17, enabling the second external force drive component 335 to drive the rotation of the spindle 17.

Specifically, in this embodiment, the second external force drive component 335 defines a receiving groove 3351 and a pushing block 3353 adjacent to the receiving groove 3351. A mating post 3313 is eccentrically formed on the sleeve 331 and is received in the receiving groove 3351, and is configured to abut against the pushing block 3353. The second external force drive component 335 is rotatably arranged to drive the pushing block 3353 to rotate, thereby rotating the mating post 3313 and, consequently, rotating the spindle 17 connected to the sleeve 331, thereby driving the deadlatch 152 and the auxiliary deadlatch 153 to extend and retract.

More specifically, the second external force drive component 335 includes a lever 3355 and a latch 3356. The lever 3355 includes a connecting part 33551 and an operating part 33553. The lever 3355 can rotate around a rotation axis passing through the connecting part 33351. The latch 3356 is fixedly connected to one side of the rotation axis of the lever 3355, and the pushing block 3353 is formed on the latch 3356. Specifically, the latch 3356 includes a latch block 33561 and a latch plate 33562. A latch groove 33555 is defined on one side of the rotation axis of the lever 3355. The latch block 33561 is engaged in the latch groove 33555, a part of the latch block 33561 protrudes out from the latch groove 33555 and is latched with the latch plate 33562, and the pushing block 3353 is disposed on the latch plate 33562.

Specifically, the indoor component 33 further includes a base 339 and an inner cover 340. The base 339 is fixed relative to the housing 151 of the mortise 15 (specifically, it can be fixed on the door panel 90). The lever 3355 is rotatably connected to the base 339. The connecting part 33551 of the lever 3355 and the latch 3356 are accommodated within the base 339. The inner cover 340 covers one side of the base 339 and covers a part of the sleeve 331. The other part of the sleeve 331 is connected to the spindle 17. Specifically, the lever 3355 may be rotatably connected to the base 339 via a rotation shaft 342.

When the user unlocks via the outdoor component 31, a password may be input in the keypad 313 to decrypt. After decryption, a first torque in the first direction may be applied to the spindle 17 via the key 111 (or in other embodiments, via a knob or a handle connected to the spindle 17 as the first external force drive component), the motor 112 (i.e., via an electronic password). Under action of this first torque in the first direction, the spindle 17 drives the drive sleeve 1553 to rotate along the first direction to drive the drive rod 1555 to move in a third direction. This action causes the deadlatch 152 to retract into the mortise 15, disengaging from the lock slot of the locked object, thereby unlocking the door panel 90 from the locked object. When the user unlocks via the indoor component 33, under action of a second torque in the first direction, the second external force drive component 335 rotates in the first direction. This rotation drives the spindle 17 to rotate in the first direction to drive the drive sleeve 1553 to rotate along the first direction, causing the deadlatch 152 to retract into the mortise 15 and disengage from the lock slot of the object to be locked, thereby unlocking the door panel 90 from the object to be locked.

When locking, when the first external force drive component or the second external force drive component 335 revokes the drive of the spindle 17 along the first direction, the drive sleeve 1553 will rotate in the second direction opposite to the first direction and reset under the action of the first reset component 1556, and disengage from the drive rod 1555. The restoring forces of the second reset component 1557 and the third reset component 1558 push the deadlatch 152 and the auxiliary deadlatch 153 to extend out of the housing 151 of the mortise 15 respectively to engage with the lock slot of the locked object, thereby locking the door panel 90 to the locked object.

It should be understood that the structure of the first external force drive component and the second external force drive component 335 in the first and second embodiments may be adjusted according to needs (they may be in the form of a knob, handle, motor, key, etc.), as long as they can drive the spindle 17 to rotate to drive the movement of the deadlatch 152 and/or the auxiliary deadlatch 153.

Third Embodiment

A third embodiment of this application further provides a mortise, and the mortise of this embodiment has the same structure as the mortise 15 in the first embodiment, and no further elaboration is needed.

The above only discloses some of the embodiments of the present disclosure and does not intend to limit the invention. Any modification, equivalents or improvement made within the spirit and principle of the disclosure shall be included in the scope of protection of the invention.

What is claimed is:

1. A mortise of a replacement lock for stores door, configured to be engaged with an outdoor component, an indoor component and a spindle passing through the mortise, the mortise comprising:

- a housing configured to be fixed and mounted within an installation space of a door panel;
- a deadlatch movably disposed within the housing;
- a drive sleeve configured to be engaged with the spindle and driven by the spindle to rotate in a first direction to drive a drive rod to move, and thereby retracting the deadlatch, the drive sleeve and the drive rod separately arranged, and the drive rod located on a rotation path of the drive sleeve, the drive rod rotatably connected to the deadlatch;
- a first reset component; and
- a second reset component, wherein when a driving force on the spindle is removed, the first reset component disposed on the drive sleeve drives the drive sleeve to rotate in a second direction opposite to the first direction to reset, thus separting the drive sleeve from the drive rod, and the deadlatch extends under an action of the second reset component connected to the deadlatch;
- wherein when the driving force is applied on the spindle, the drive sleeve is rotated to resist the drive rod, thereby driving the drive rod to move.

2. The mortise of claim 1, wherein the drive sleeve is located within the housing and is rotatably connected to two sides of the housing.

3. The mortise of claim 1, wherein the drive sleeve comprises a sleeve tube and a single rod, the rod protrudes from one side of an outer periphery of the sleeve tube, and the rod rotates within a certain range with the rotation of the drive sleeve to resist and drive the drive rod or separate from the drive rod.

4. The mortise of claim 1, wherein the drive sleeve is configured to be engaged with the spindle to move together with the spindle, the drive sleeve is configured to receive the driving force from either end of the spindle to rotate, and one side of the drive sleeve protrudes to drive the drive rod to retract the deadlatch to achieve unlocking.

5. The mortise of claim 1, wherein the drive sleeve has a coupling hole non-rotatably coupled with the spindle, so that when the spindle is driven to rotate in the first direction, the spindle is capable of driving the drive sleeve to rotate.

6. The mortise of claim 1, wherein the first reset component is an elastic element, one end of the first reset component is fixed relative to the drive sleeve, and the other end of the first reset component is fixed relative to the housing; the second reset component is an elastic element, one end of the second component abuts the housing, and the other end of the second component abuts the deadlatch.

7. The mortise of claim 1, wherein the mortise further comprises an auxiliary deadlatch and a third reset component, the auxiliary deadlatch is movably disposed within the housing, the drive sleeve is also configured to drive the auxiliary deadlatch to retract when rotating in the first direction; when the driving force on the spindle is removed and the first reset component on the drive sleeve drives the drive sleeve to rotate in a second direction opposite to the first direction to reset, the auxiliary deadlatch extends under an action of the third reset component connected to the auxiliary deadlatch.

8. The mortise of claim 7, wherein the housing comprises a first side plate, a second side plate, a first connecting plate, a second connecting plate, and a front plate, the first side plate and the second side plate are parallel and spaced apart, the first connecting plate and the second connecting plate are connected to the first side plate and the second side plate respectively to connect them together, and the front plate is located on the front side of the housing.

9. The mortise of claim 8, wherein the first side plate and/or the second side plate are provided with a first limiting groove and a second limiting groove extending along a moving direction of the deadlatch, a first limiting block is formed on the deadlatch to movably positioned within the first limiting groove, and a second limiting block is formed on the auxiliary deadlatch to movably positioned within the second limiting groove; the first side plate and/or the second side plate are further provided with a guiding groove, a protrusion formed on the drive rod is movably accommodated within the guide groove of the housing.

10. The mortise of claim 9, wherein the drive rod comprises a first part, a second part, and a third part, two ends of the second part are connected to the first part and the third part respectively, the first part is oriented towards the drive sleeve, the first part and the third part extend towards two sides of the second part respectively and form a certain angle with the second part respectively, a shaft hole is further defined in the drive rod, and the drive rod is rotatably connected to the deadlatch via a connecting shaft inserted into the shaft hole, the drive rod is rotatable around the connecting shaft relative to the deadlatch, and the shaft hole is defined at the connecting position between the second part and the third part.

11. The mortise of claim 10, wherein one side of the auxiliary deadlatch is provided with an extension portion, the extension portion corresponds to the third part, so that when the auxiliary deadlatch retracts, the extension portion comes into contact with the third part.

12. A replacement lock for stores door, configured to be mounted on a first component of a stores door so as to lock or unlock the first component relative to a second component, the replacement lock for stores door comprising:

the mortise according to claim 1, the housing comprising a first side plate, a second side plate and a front plate, the first side plate and the second side plate being parallel and spaced apart, the front plate located on a front side of the housing, each of the first side plate and the second side plate defining two installation holes and an inserting hole between the two installation holes;

an outdoor component configured to mounted at an outer side of the first component;

an indoor component configured to mounted at an inner side of the first component;

a spindle rotatably disposed and passing through a coupling hole of the drive sleeve, the spindle having opposite first and second ends, and the spindle configured to receive external force from either end of the first and second ends to drive the drive sleeve;

two installation fixing components, extending through the two installation holes of each of the first side plate and the second side plate respectively, the or each installation fixing component having two axial ends that are respectively fixedly connected to the the indoor component and the outdoor component; and wherein the mortise is located between the indoor component and the outdoor component, and the spindle extends inward from the outdoor component through the mortise and is connected to the indoor component, the spindle extends through the inserting holes of the first side plate and the second side plate.

13. The replacement lock for stores door of claim 12, wherein the outdoor component includes a first external force drive component connected to one end of the spindle, the first external force drive component is configured to drive the spindle to rotate to drive the drive sleeve to rotate in the first direction; the indoor component comprises a second external force drive component connected to the other end of the spindle, the second external force drive component is configured to drive the spindle to rotate to drive the drive sleeve to rotate in the first direction.

14. The replacement lock for stores door of claim 13, wherein the outdoor component comprises a cylinder core connected to the first end of the spindle, an outer main housing and an outer cover plate, the outer main housing has an opening on one side, and the outer cover plate covers the opening of the outer main housing, the cylinder core is located in the outer main housing, a protruding post is formed on the cylinder core, and a first hole for the spindle to pass through is defined in the outer cover plate, one end of the spindle is provided with a base plate, which is provided with a notch, the protruding post of the cylinder core is configured to abut against two end surfaces of the notch of the base plate, when the cylinder core rotates, the protruding post on the cylinder core pushes the base plate to rotate, the outer cover plate is located on the side of the outer main housing facing the mortise.

15. The replacement lock for stores door of claim 14, wherein the indoor component further comprises an inner main housing, an inner sub-housing, an inner sub-cover, and an inner cover, the inner sub-cover covers an opening of the inner sub-housing, the inner sub-housing and the inner sub-cover are located inside the inner main housing, and the inner cover covers an opening of the inner main housing, a motor is mounted outside the inner sub-housing and connected to the spindle to drive the spindle to rotate.

16. The replacement lock for stores door of claim 15, wherein the first external force drive component comprises a key engaged with the cylinder core and a motor connected to the spindle, the outdoor component further comprises an input component, which is electrically connected to the motor via a conductive wire; the outer cover plate is provided with a first through hole for the conductive wire to pass through and extend into the outer main housing, the inner cover plate is provided with a second through hole for the conductive wire to pass through, and each of the first side plate and the second side plate defines a third through hole for allowing the conductive circuit to pass through.

17. The replacement lock for stores door of claim 12, wherein the installation fixing component comprises one or more screw disposed on the indoor component;

wherein the outdoor component has one or more installation post, one of the screw and the installation post passes through the mortise, and the screw and the installation post are connected to each other; or the outdoor component has one or more screw hole, and the screw passes through the mortise and is connected to the screw hole.

18. The replacement lock for stores door of claim 12, wherein the first reset component is an elastic element, one end of the first reset component is fixed relative to the drive sleeve, and the other end of the first reset component is fixed relative to the housing; the second reset component is an elastic element, one end of the second component abuts the housing, and the other end of the second component abuts the deadlatch.

19. The replacement lock for stores door of claim 12, wherein the mortise further comprises an auxiliary deadlatch, the auxiliary deadlatch is movably disposed within the housing, the drive sleeve is also configured to drive the auxiliary deadlatch to retract when rotating in the first direction; when the driving force on the spindle is removed and the first reset component on the drive sleeve drives the drive sleeve to rotate in a second direction opposite to the first direction to reset, the auxiliary deadlatch extends under the action of the third reset component connected to the auxiliary deadlatch.

20. The replacement lock for stores door of claim 12, wherein the drive sleeve comprises a sleeve tube and a rod, the rod protrudes from one side of an outer periphery of the sleeve tube, and the rod rotates within a certain range with the rotation of the drive sleeve to resist and drive the drive rod or separate from the drive rod; in a direction perpendicular to the moving direction of the deadlatch, a gap is defined between the sleeve tube of the drive sleeve and the drive rod.

* * * * *